US 11,480,858 B2

(12) United States Patent
Nagatani

(10) Patent No.: US 11,480,858 B2
(45) Date of Patent: Oct. 25, 2022

(54) PROJECTOR AND COOLING DEVICE

(71) Applicant: SEIKO EPSON CORPORATION, Tokyo (JP)

(72) Inventor: Kaname Nagatani, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/213,330

(22) Filed: Mar. 26, 2021

(65) Prior Publication Data
US 2021/0302816 A1 Sep. 30, 2021

(30) Foreign Application Priority Data
Mar. 27, 2020 (JP) .............................. JP2020-057353

(51) Int. Cl.
*G03B 21/16* (2006.01)
*G03B 21/20* (2006.01)
*G03B 21/00* (2006.01)
*H04N 9/31* (2006.01)

(52) U.S. Cl.
CPC ........... *G03B 21/16* (2013.01); *G03B 21/005* (2013.01); *G03B 21/2033* (2013.01); *H04N 9/3144* (2013.01)

(58) Field of Classification Search
CPC ............................... G03B 21/16; H04N 9/3144
See application file for complete search history.

(56) References Cited

U.S. PATENT DOCUMENTS

| 9,261,761 B2 | 2/2016 | Kuriaki | |
|---|---|---|---|
| 2006/0285331 A1* | 12/2006 | Wang | H04N 9/3141 348/E5.142 |
| 2008/0030688 A1* | 2/2008 | Lee | G03B 21/16 353/54 |
| 2008/0236190 A1* | 10/2008 | Tsuchiya | G03B 21/16 62/468 |
| 2008/0236191 A1* | 10/2008 | Tsuchiya | G03B 21/16 62/513 |
| 2009/0266098 A1* | 10/2009 | Nishijima | G03B 21/16 62/513 |

(Continued)

FOREIGN PATENT DOCUMENTS

| JP | 2002-131737 A | 2/2002 |
| JP | 2009-042379 A | 2/2009 |
| JP | 2015-132659 A | 7/2015 |

*Primary Examiner* — Bao-Luan Q Le
(74) *Attorney, Agent, or Firm* — Dority & Manning, P.A.

(57) ABSTRACT

A projector includes a first cooling target, a cooling device, and an exterior housing. The cooling device includes a first circulation device in which working fluid circulates, a second circulation device in which a liquid refrigerant circulates, and a heat exchanger in which both of the working fluid and the liquid refrigerant flow. The first circulation device includes a first compressor, a condenser, a first expander, and a first evaporator. The second circulation device includes a first heat receiver heat-transferably connected to the first cooling target. The heat exchanger includes a first channel in which the working fluid having flowed in the first expander flows, and a second channel in which the liquid refrigerant having flowed in the first heat receiver flows. The heat exchanger cools the liquid refrigerant flowing in the second channel with the working fluid flowing in the first channel.

15 Claims, 13 Drawing Sheets

(56) References Cited

U.S. PATENT DOCUMENTS

| | | | | |
|---|---|---|---|---|
| 2010/0045940 A1* | 2/2010 | Takagi | ................... | G03B 21/16 |
| | | | | 353/54 |
| 2010/0066980 A1* | 3/2010 | Tsuchiya | .............. | H04N 9/3105 |
| | | | | 353/57 |
| 2010/0118279 A1* | 5/2010 | Itsuki | ................... | H04N 9/3144 |
| | | | | 353/54 |
| 2010/0302463 A1* | 12/2010 | Matsumoto | ............ | G03B 21/16 |
| | | | | 348/744 |
| 2010/0315600 A1* | 12/2010 | Nishimura | .............. | F21V 29/67 |
| | | | | 353/57 |
| 2011/0019160 A1* | 1/2011 | Kitano | ................... | G03B 21/16 |
| | | | | 353/57 |
| 2011/0032489 A1* | 2/2011 | Kimoto | ................ | H04N 9/3144 |
| | | | | 353/56 |
| 2011/0037954 A1* | 2/2011 | Tsuchiya | .............. | H04N 9/3164 |
| | | | | 353/54 |
| 2011/0211166 A1* | 9/2011 | Kawano | .............. | H04N 9/3144 |
| | | | | 353/20 |
| 2015/0198869 A1* | 7/2015 | Kuriaki | ................ | G03B 21/005 |
| | | | | 353/54 |
| 2016/0377349 A1* | 12/2016 | Cool | ..................... | F28D 9/0037 |
| | | | | 165/109.1 |
| 2020/0296859 A1* | 9/2020 | Takagi | ............... | H05K 7/20309 |

* cited by examiner

PROJECTOR AND COOLING DEVICE

The present application is based on, and claims priority from JP Application Serial Number 2020-057353, filed Mar. 27, 2020, the disclosure of which is hereby incorporated by reference herein in its entirety.

BACKGROUND

1. Technical Field

The present disclosure relates to a projector.

2. Related Art

There has been known a projector including an indoor unit that is disposed inside a room and projects a video and an outdoor unit that is disposed outside the room (see, for example, JP-A-2015-132659 (Patent Literature 1)).

In the projector described in Patent Literature 1, the indoor unit includes R, G, and B laser clusters, an optical combining section, and a projection lens and includes R, G, and B laser heat sinks, a first refrigerant pipe, a drain pipe, and an electronic expansion valve. The outdoor unit includes a second refrigerant pipe, a cooling device, and a refrigerant heating heater. Between the indoor unit and the outdoor unit, a refrigerant pipe connecting one end of the first refrigerant pipe and one end of the second refrigerant pipe and connecting the other end of the first refrigerant pipe and the other end of the second refrigerant pipe and a communication line are disposed.

In the projector, the electronic expansion valve, the G laser heat sink, the B laser heat sink, and the R laser heat sink are connected in series in this order via the first refrigerant pipe.

The second refrigerant pipe and the first refrigerant pipe form an annular refrigerant path via the refrigerant pipe, refrigerant circulates in the order of one end of the electronic expansion valve, the laser heat sinks, the refrigerant heating heater, a refrigerant compressor and a condenser of the cooling device, and the other end of the electronic expansion valve.

The refrigerant compressor compresses a refrigerant gas to thereby raise the refrigerant gas in temperature and pressure. The condenser exchanges the heat of the refrigerant gas raised in temperature and pressure with the heat of outdoor air caused to flow into the outdoor unit from the outside the outdoor unit by a fan to thereby change the refrigerant gas to high-pressure liquid refrigerant.

The electronic expansion valve decompresses the high-pressure liquid refrigerant and changes the high-pressure liquid refrigerant to liquid refrigerant that easily vaporizes. The electronic expansion valve controls a decompression amount of the refrigerant in the first refrigerant pipe to thereby control an evaporation temperature of the refrigerant and cool the laser heat sinks with a latent heat effect of the refrigerant.

When the refrigerant flows into the refrigerant compressor in a state in which the refrigerant is not completely vaporized, an adverse effect occurs in the refrigerant compressor. Therefore, the refrigerant to be caused to flow into the refrigerant compressor is heated by the refrigerant heating heater.

With the configuration explained above, the temperature of the laser heat sinks and the like is kept constant by the latent heat effect of the refrigerant in a portion from one end of the electronic expansion valve to the laser heat sinks and the refrigerant heating heater in the refrigerant path. In this way, the cooling device is capable of cooling the laser heat sinks and the R, G, and B laser clusters to a certain constant temperature via the refrigerant circulating in the refrigerant path.

However, since the projector described in Patent Literature 1 includes the outdoor unit connected to the indoor unit via the refrigerant pipe and the communication line, it is complicated to set the projector.

SUMMARY

A projector according to an aspect of the present disclosure modulates and projects light emitted from a light source, and the projector includes: a first cooling target; a cooling device configured to cool the first cooling target; and an exterior housing accommodating the first cooling target and the cooling device. The cooling device includes a first circulation device in which working fluid circulates, a second circulation device in which a liquid refrigerant circulates, and a heat exchanger in which both of the working fluid and the liquid refrigerant flow. The first circulation device includes a first compressor configured to compress the working fluid in a gas phase, a condenser configured to condense the working fluid in the gas phase compressed by the first compressor into the working fluid in a liquid phase, a first expander configured to decompress the working fluid in the liquid phase condensed by the condenser and change the working fluid in the liquid phase to the working fluid in a mixed phase of the liquid phase and the gas phase, and a first evaporator configured to change the working fluid flowed from the first expander to the working fluid in the gas phase with heat transferred from the first cooling target and discharge the changed working fluid in the gas phase to the first compressor. The second circulation device includes a first heat receiver heat-transferably connected to the first cooling target the liquid refrigerant flowing on an inside of the first heat receiver. The heat exchanger includes a first channel in which the working fluid having flowed in the first expander flows, and a second channel in which the liquid refrigerant having flowed in the first heat receiver flows. The heat exchanger cools the liquid refrigerant flowing in the second channel with the working fluid flowing in the first channel.

DESCRIPTION OF EXEMPLARY EMBODIMENTS

First Embodiment

A first embodiment of the present disclosure is explained below with reference to the drawings.

Schematic Configuration of a Projector

Figure 1:
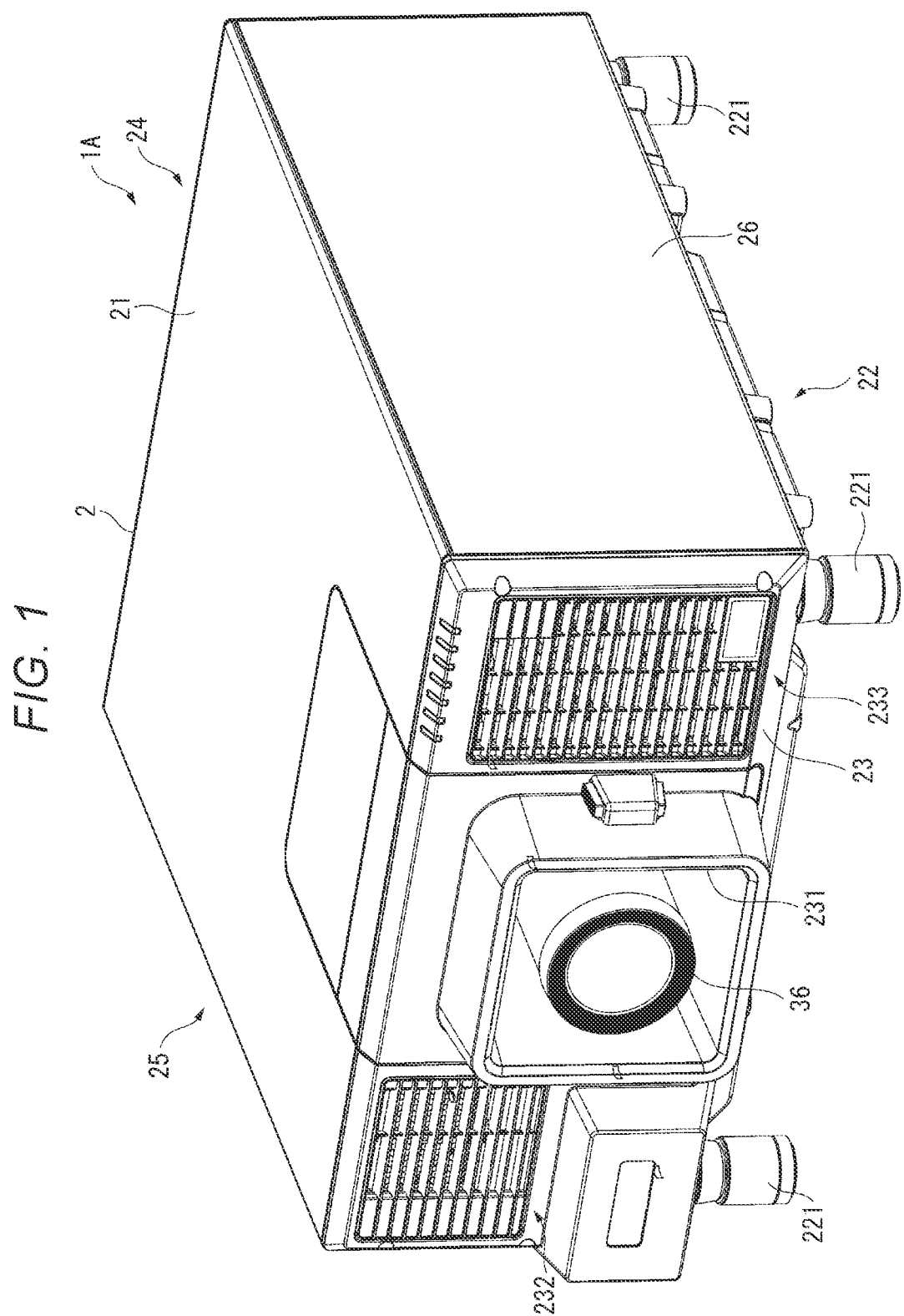
FIG. 1 is a perspective view showing the exterior of a projector in a first embodiment.

FIG. 1 is a perspective view showing the exterior of a projector 1A according to this embodiment.

The projector 1A according to this embodiment is an image display apparatus that modulates light emitted from a light source, forms an image corresponding to image information, and enlarges and projects the formed image onto a projection surface such as a screen. As shown in FIG. 1, the projector 1A includes an exterior housing 2 configuring the exterior of the projector 1A.

Configuration of the Exterior Housing

The exterior housing 2 includes a top surface section 21, a bottom surface section 22, a front surface section 23, a rear surface section 24, a left side surface section 25, and a right side surface section 26 and is formed in a substantially rectangular parallelepiped shape.

The bottom surface section 22 includes a plurality of leg sections 221 that are in contact with a setting surface on which the projector 1A is placed.

The front surface section 23 is located on an image projection side in the exterior housing 2. The front surface section 23 includes an opening section 231 that exposes a part of a projection optical device 36 explained below. An image projected by the projection optical device 36 passes through the opening section 231. The front surface section 23 includes an exhaust port 232 and an introduction port 233 in positions holding the opening section 231 between the ports. The exhaust port 232 is located on the left side surface section 25 side in the front surface section 23 and discharges a cooling gas, which has cooled a cooling target in the projector 1A, to the outside of the exterior housing 2. The introduction port 233 is located on the right side surface section 26 side in the front surface section 23 and introduces gas such as air on the outside of the exterior housing 2 into the inside of the exterior housing 2 as the cooling gas.

Internal Configuration of the Projector

Figure 2:
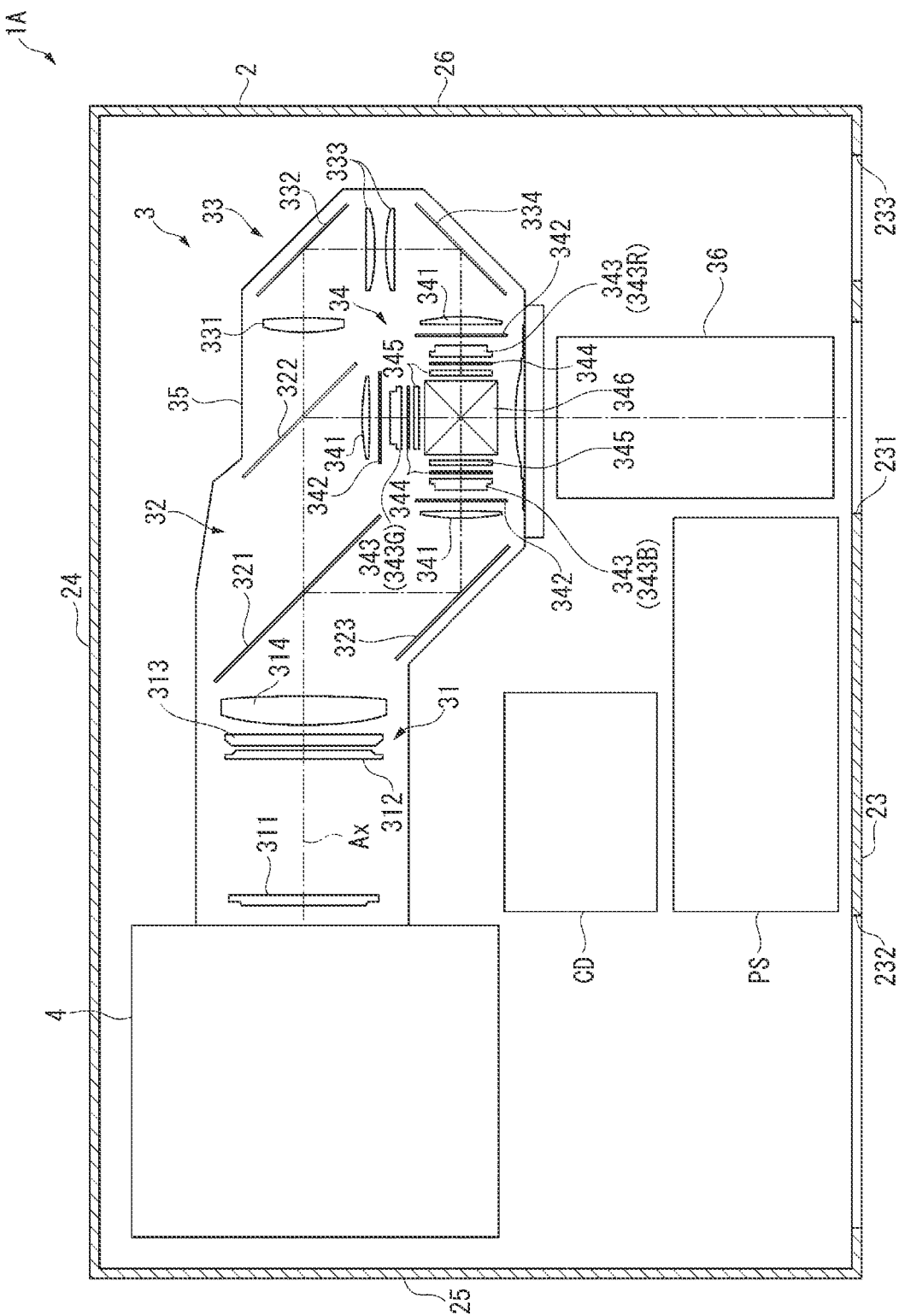
FIG. 2 is a schematic diagram showing an internal configuration of the projector in the first embodiment.

FIG. 2 is a schematic diagram showing an internal configuration of the projector 1A.

As shown in FIG. 2, the projector 1A further includes an image projecting device 3, a power supply device PS, and a control device CD. The image projection device 3, the power supply device PS, and the control device CD are housed in the exterior housing 2. Besides, although not shown in FIG. 2, the projector 1A includes a cooling target and a cooling device 5A (see FIG. 4) that cools at least one of the image projecting device 3, the power supply device PS, and the control device CD as the cooling target.

The power supply device PS transforms a voltage of electric power supplied from the outside and supplies the transformed electric power to the electronic components of the projector 1A.

The control device CD controls the operation of the projector 1A. As the control device CD, for example, a circuit board mounted with an integrated circuit can be illustrated.

Configuration of the Image Projecting Device

The image projecting device 3 forms an image corresponding to image information input from the control device and projects the formed image. The image projecting device 3 includes a light source device 4, an equalizing section 31, a color separating section 32, a relay section 33, an image forming section 34, a housing for optical components 35, and a projection optical device 36.

The light source device 4 emits illumination light. The configuration of the light source device 4 is explained in detail below.

The equalizing section 31 equalizes the illumination light emitted from the light source device 4. The equalized illumination light passes through the color separating section 32 and the relay section 33 and illuminates a modulation region of light modulators 343 explained below of the image forming section 34. The equalizing section 31 includes two lens arrays 311 and 312, a polarization conversion element 313, and a superimposing lens 314.

The color separating section 32 separates light made incident from the equalizing section 31 into color lights of red, green, and blue. The color separating section 32 includes two dichroic mirrors 321 and 322 and a reflection mirror 323 that reflects the blue light separated by the dichroic mirror 321.

The relay section 33 is provided on an optical path of the red light longer than optical paths of the other color lights and suppresses a loss of the red light. The relay section 33 includes an incident-side lens 331, a relay lens 333, and reflection mirrors 332 and 334. In this embodiment, the relay section 33 is provided on the optical path of the red light. However, not only this, but, for example, the color light having an optical path longer than optical paths of the other lights may be the blue light and the relay section 33 may be provided on the optical path of the blue light.

The image forming section 34 modulates the red, green, and blue lights made incident thereon and combines the modulated color lights to form an image. The image forming section 34 includes three field lenses 341, three incident-side polarizing plates 342, three light modulators 343, three viewing angle compensating plates 344, and three emission-side polarizing plates 345 provided according to the incident color lights and one color combining section 346.

The light modulators 343 modulate, according to image information, light emitted from the light source device 4. The light modulators 343 include a light modulator 343R for red light, a light modulator 343G for green light, and a light modulator 343B for blue light. In this embodiment, the light modulators 343 are configured by transmission-type liquid crystal panels. A liquid crystal light valve is configured by the incident-side polarizing plates 342, the light modulators 343, and the emission-side polarizing plates 345.

The color combining section 346 combines the color lights modulated by the light modulators 343B, 343G, and 343R to form an image. In this embodiment, the color combining section 346 is configured by a cross dichroic prism. However, not only this, but the color combining section 346 can be configured by, for example, a plurality of dichroic mirrors.

The housing for optical components 35 houses the sections 31 to 34 inside. An illumination optical axis Ax, which is an optical axis in design, is set in the image projecting device 3. The housing for optical components 35 holds the sections 31 to 34 in predetermined positions on the illumination optical axis Ax. The light source device 4 and the projection optical device 36 are disposed in predetermined positions on the illumination optical axis Ax.

The projection optical device 36 is a projection lens that enlarges and projects an image made incident from the image forming section 34 onto the projection surface. That is, the projection optical device 36 projects light modulated by the light modulators 343B, 343G, and 343R. The projection optical device 36 is configured as, for example, a group lens in which a plurality of lenses are housed in a tubular lens barrel.

Configuration of the Light Source Device

Figure 3:
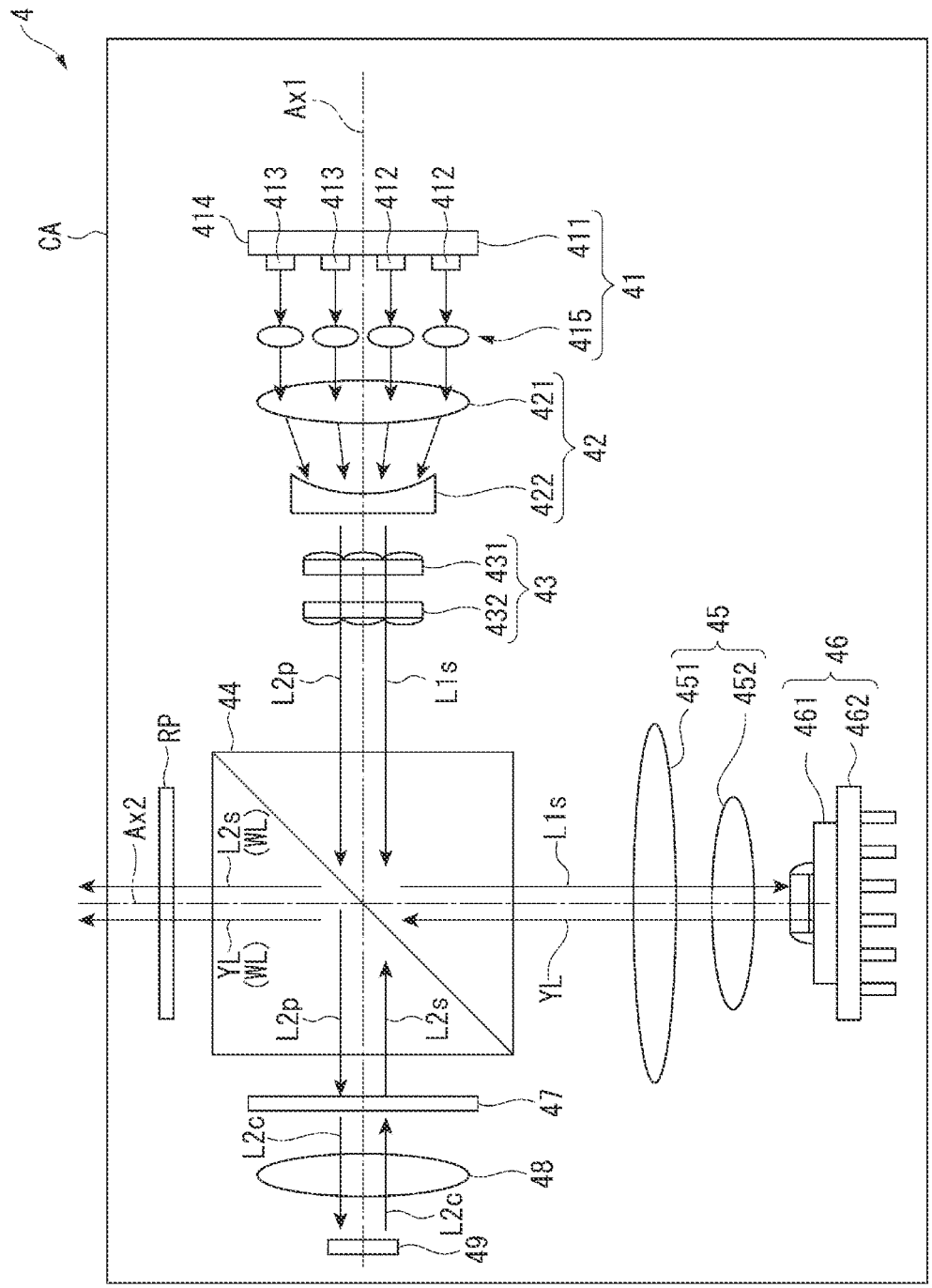
FIG. 3 is a schematic diagram showing the configuration of a light source device in the first embodiment.

FIG. 3 is a schematic diagram showing the configuration of the light source device 4.

The light source device 4 emits illumination light to the equalizing section 31. The light source device 4 includes, as shown in FIG. 3, a housing for light source CA and a light source section 41, an afocal optical element 42, a homogenizer optical element 43, a polarization separating element 44, a first condensing element 45, a wavelength conversion element 46, a first phase difference element 47, a second condensing element 48, a diffuse reflection section 49, and a second phase difference element RP housed in the housing for light source CA.

The housing for light source CA is configured as a sealed housing into which dust and the like less easily intrude.

The light source section 41, the afocal optical element 42, the homogenizer optical element 43, the polarization separating element 44, the first phase difference element 47, the second condensing element 48, and the diffuse reflection section 49 are disposed on an illumination optical axis Ax1 set in the light source device 4.

The wavelength conversion element 46, the first condensing element 45, the polarization separating element 44, and the second phase difference element RP are set in the light source device 4 and disposed on an illumination optical axis Ax2 orthogonal to the illumination optical axis Ax1. The illumination optical axis Ax2 coincides with the illumination optical axis Ax in the position of the lens array 311. In other words, the illumination optical axis Ax2 is set on an extended line of the illumination optical axis Ax.

Configuration of the Light Source Section

The light source section 41 includes a light source 411 that emits light and a collimator lens 415.

The light source 411 includes a plurality of first semiconductor lasers 412 and a plurality of second semiconductor lasers 413 and a supporting member 414.

The first semiconductor laser 412 emits s-polarized blue light Lis, which is excitation light. The blue light Lis is, for example, laser light, a peak wavelength of which is 440 nm. The blue light Lis emitted from the first semiconductor laser 412 is made incident on the wavelength conversion element 46.

The second semiconductor laser 413 emits p-polarized blue light L2p. The blue light L2p is, for example, laser light, a peak wavelength of which is 460 nm. The blue light L2p emitted from the second semiconductor laser 413 is made incident on the diffuse reflection section 49.

The supporting member 414 supports the plurality of first semiconductor lasers 412 and the plurality of second semiconductor lasers 413 respectively disposed in an array on a plane orthogonal to the illumination optical axis Ax1.

The blue light Lis emitted from the first semiconductor laser 412 and the blue light L2p emitted from the second semiconductor laser 413 are converted into parallel light beams by the collimator lens 415 and made incident on the afocal optical element 42.

In this embodiment, the light source 411 is configured to emit the s-polarized blue light Lis and the p-polarized blue light L2p. However, not only this, but the light source 411 may be configured to emit blue light, which is linearly polarized light having the same polarizing direction. In this case, a phase difference element that changes incident one kind of linearly polarized light to light including the s-polarized light and the p-polarized light only has to be disposed between the light source section 41 and the polarization separating element 44.

Configurations of the Afocal Optical Element and the Homogenizer Optical Element The afocal optical element 42 adjusts light beam diameters of the blue lights Lis and L2p made incident from the light source section 41 and makes the blue lights Lis and L2p incident on the homogenizer optical element 43. The afocal optical element 42 is configured by a lens 421 that condenses incident light and a lens 422 that collimates a light beam condensed by the lens 421.

The homogenizer optical element 43 equalizes illuminance distributions of the blue lights Lis and L2p. The homogenizer optical element 43 is configured by a pair of multi-lens arrays 431 and 432. A diffusing element that diffuses incident light may be provided instead of the homogenizer optical element 43.

Configuration of the Polarization Separating Element

The blue lights Lis and L2p passed through the homogenizer optical element 43 are made incident on the polarization separating element 44.

The polarization separating element 44 is a prism-type polarization beam splitter and separates an s-polarization component and a p-polarization component included in incident light. Specifically, the polarization separating element 44 reflects the s-polarization component and allows the p-polarization component to pass. The polarization separating element 44 has a color separation characteristic for causing light having a predetermined wavelength or more to pass irrespective of whether a polarization component is the s-polarization component or the p-polarization component. Therefore, the s-polarized blue light Lis is reflected by the polarization separating element 44 and made incident on the first, condensing element 45. On the other hand, the p-polarized blue light L2p passes through the polarization separating element 44 and is made incident on the first phase difference element 47.

Configuration of the First Condensing Element

The first condensing element 45 condenses the blue light Lis reflected by the polarization separating element 44 on the wavelength conversion element 46. The first condensing element 45 collimates fluorescent light YL made incident from the wavelength conversion element 46. In an example shown in FIG. 3, the first condensing element 45 is configured by two lenses 451 and 452. However, the number of lenses configuring the first condensing element 45 may be any number.

Configuration of the Wavelength Conversion Element

The wavelength conversion element 46 is excited by incident light, generates the fluorescent light YL, the wavelength of which is longer than the wavelength of the incident light, and emits the fluorescent light YL to the first condensing element 45. In other words, the wavelength conversion element 46 converts the wavelength of the incident light and emits converted light. The fluorescent light YL generated by the wavelength conversion element 46 is, for example, light, a peak wavelength of which is 500 to 700 nm. The wavelength conversion element 46 includes a wavelength converting section 461 and a heat radiating section 462.

Although not illustrated, the wavelength converting section 461 includes a wavelength conversion layer and a reflection layer. The wavelength conversion layer includes a phosphor that diffuses and emits the fluorescent light YL, which is no polarized light obtained by converting the wavelength of the incident blue light Lis. The reflection layer reflects the fluorescent light YL made incident from the wavelength conversion layer to the first condensing element 45 side.

The heat radiating section 462 is provided on a surface on the opposite side of a light incident side in the wavelength converting section 461 and radiates heat generated in the wavelength converting section 461.

The fluorescent light YL emitted from the wavelength conversion element 46 passes through the first condensing element 45 along the illumination optical axis Ax2 and is thereafter made incident on the polarization separating element 44 having the color separation characteristic explained above. The fluorescent light YL passes through the polarization separating element 44 along the illumination optical axis Ax2 and is made incident on the second phase difference element; RP.

The wavelength conversion element 46 may be configured to be rotated around a rotation axis parallel to the illumination optical axis Ax2 by a rotating device such as a motor.

Configurations of the First Phase Difference Element and the Second Condensing Element The first phase difference element 47 is disposed between the polarization separating element 44 and the second condensing element 48. The first phase difference element 47 converts the blue light L2p passed through the polarization separating element 44 into circularly polarized blue light L2c. The blue light L2c is made incident on the second condensing element 48.

The second condensing element 48 condenses the blue light L2c made incident from, the first phase difference element 47 on the diffuse reflection section 49. The second condensing element 48 collimates the blue light L2c made incident from, the diffuse reflection section 49. The number of lenses configuring the second condensing element 48 can be changed as appropriate.

Configuration of the Diffuse Reflection Section

The diffuse reflection section 49 reflects and diffuses the incident blue light L2c at the same diffusion angle as a diffusion angle of the fluorescent light YL emitted from the wavelength conversion element 46. As the configuration of the diffuse reflection section 49, a configuration including a reflection plate that causes Lambertian reflection of the incident blue light L2c and a rotating device that rotates the reflection plate around a rotation axis parallel to the illumination optical axis Ax1 can be illustrated.

The blue light L2c reflected by the diffuse reflection section 49 passes through the second condensing element 48 and is thereafter made incident on the first phase difference element 47. The blue light L2c is converted into a circularly polarized light, a rotating direction of which is the opposite direction, when being reflected by the diffuse reflection section 49. Accordingly, the blue light L2c made incident on the first phase difference element 47 via the second condensing element 48 is converted into s-polarized blue light L2s rather than p-polarized blue light L2p into which the blue light L2c is converted when the blue light L2c is made incident on the first phase difference element 47 from the polarization separating element 44. The blue light L2s is reflected by the polarization separating element 44 and made incident on the second phase difference element RP. That is, light made incident on the second phase difference element RP from the polarization separating element 44 is white light in which the blue light L2s and the fluorescent light YL are mixed.

Configuration of the Second Phase Difference Element

The second phase difference element RP converts the white light made incident from the polarization separating element 44 into light in which the s-polarized light and the p-polarized light are mixed. White illumination light WL converted in this way is made incident on the equalizing section 31.

Configuration of the Cooling Device

Figure 4:
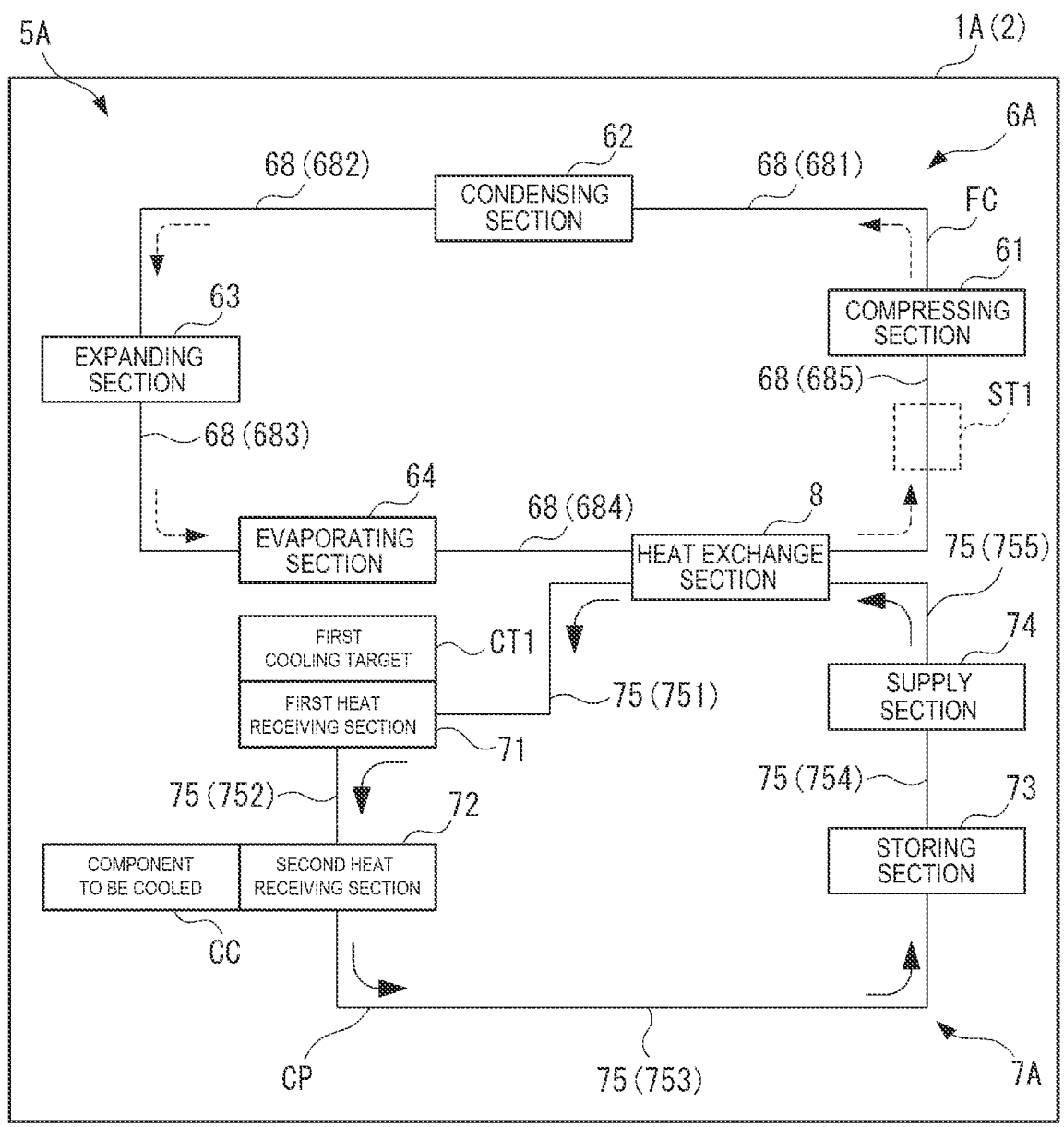
FIG. 4 is a schematic diagram showing the configuration of a cooling device in the first embodiment.

FIG. 4 is a schematic diagram showing the cooling device 5A. In FIG. 4, a flowing direction of working fluid is indicated by dotted line arrows.

The cooling device 5A cools a first cooling target CT1 and a component to be cooled CC configuring the projector 1A. That is, the projector 1A includes the first cooling target CT1 and the component to be cooled CC. The cooling device 5A includes a first circulation device 6A, a second circulation device 7A, and a heat exchanger 8.

Cooling targets of the cooling device 5A include the light source 411, the wavelength conversion element 46, the polarizing conversion element 313, the light modulators 343, the emission-side polarizing plates 345, the power supply device PS, and the control device CD. The cooling targets of the cooling device 5A include the first cooling target CT1 and a second cooling target CT2 different from the first cooling target CT1. As shown in FIG. 4, the cooling device 5A, the first cooling target CT1, and the second cooling target CT2 are housed in the exterior housing 2.

In the following explanation, it is assumed that the first cooling target CT1 is the light modulators 343 and the second cooling target CT2 is the power supply device PS.

Configuration of the First Circulation Device

The first circulation device 6A circulates the working fluid and cools the first cooling target CT1. The first circulation device 6A includes a compressor 61, a condenser 62, an expander 63, and an evaporator 64 and a plurality of pipes 68.

The compressor 61 is equivalent to the first compressor, the expander 63 is equivalent to the first expander, and the evaporator 64 is equivalent to the first evaporator.

Configuration of the Pipes

The plurality of pipes 68 are tubular members annularly connecting the compressor 61 the condenser 62, the expander 63, the evaporator 64 and the heat exchanger 8. The working fluid flows on the insides of the plurality of pipes 68. The plurality of pipes 68 include a first pipe 681, a second pipe 682, a third pipe 683, a fourth pipe 684, and a fifth pipe 685.

The first pipe 681 connects the compressor 61 and the condenser 62. The second pipe 682 connects the condenser 62 and the expander 63. The first pipe 681 and the second pipe 682 are formed of a material having relatively high strength against working fluid having relatively high pressure, for example, metal.

The third pipe 683 connects the expander 63 and the evaporator 64. The fourth pipe 684 connects the evaporator 64 and the heat exchanger 8. The fifth pipe 685 connects the heat exchanger 8 and the compressor 61. The third pipe 683, the fourth pipe 684, and the fifth pipe 685 are formed of metal in this embodiment but may be formed of a material other than metal such as resin.

In this way, the first circulation device 6A includes a fluid circulation channel FC in which the working fluid flows in the compressor 61, the condenser 62, the expander 63, the evaporator 64, and the heat exchanger 8 in order and flows into the compressor 61 again. That is, the compressor 61, the condenser 62, the expander 63, the evaporator 64, and the heat exchanger 8 are provided in the fluid circulation channel FC.

Configuration of the Compressor

The compressor 61 compresses the working fluid in a gas phase. That is, the compressor 61 compresses the working fluid in the gas phase flowing into the compressor 61 from the fifth pipe 685 to thereby raise the working fluid in the gas phase in temperature and pressure. The working fluid in the gas phase raised in temperature and pressure by the compressor 61 flows to the condenser 62 via the first pipe 681.

Configuration of the Condenser

The condenser 62 is connected to the compressor 61 via the first pipe 681. The condenser 62 condenses the working fluid in the gas phase compressed by the compressor 61, that is, the working fluid in the gas phase raised in temperature and pressure into the working fluid in a liquid phase. Specifically, the condenser 62 performs heat exchange between the compressed working fluid in the gas phase and a cooling gas introduced into the inside of the exterior housing 2 from the outside of the exterior housing 2 and caused to flow to the condenser 62 by a not-shown cooling fan to thereby condense the working fluid in the gas phase into the high-pressure working fluid in the liquid phase.

Configuration of the Expander

The expander 63 is a decompressor and is connected to the condenser 62 via the second pipe 682. The working fluid in the liquid phase condensed by the condenser 62 flows into the expander 63.

The expander 63 decompresses the working fluid in the liquid phase condensed by the condenser 62 and changes a state of the working fluid to a mixed state of the liquid phase and the gas phase. That is, the expander 63 lowers the temperature of the working fluid. The expander 63 discharges the working fluid in the mixed state of the liquid phase and the gas phase to the evaporator 64 via the third pipe 683.

The expander 63 can be configured by, for example, an expansion valve, more specifically, an electronic expansion valve capable of controlling an evaporation temperature of the working fluid in the liquid phase and can be configured by a capillary tube.

Configuration of the Evaporator

The evaporator 64 is connected to the expander 63 via the third pipe 683. The evaporator 64 is disposed at an interval from the first cooling target CT1. The evaporator 64 evaporates, with heat transferred from the first cooling target CT1, the working fluid in the liquid phase flowing from the expander 63 and changes the working fluid in the liquid phase to the working fluid in the gas phase. For example, the evaporator 64 evaporates the working fluid in the liquid phase with the heat transferred from the first cooling target CT1 via the cooling gas sent by a not-shown fan and having cooled the first cooling target CT1 and changes the working fluid in the liquid phase to the working fluid in the gas phase. The evaporator 64 discharges the changed working fluid in the gas phase to the compressor 61 via the fourth pipe 684, the heat exchanger 8, and the fifth pipe 685. Consequently, the heat of the first cooling target CT1 is consumed and the first cooling target CT1 is cooled.

Configuration of the Second Circulation Device

The second circulation device 7A includes a first heat receiver 71, a second heat receiver 72, a reserver 73, and a supply section 74 and a plurality of flow pipes 75. The second circulation device 7A circulates a liquid refrigerant to thereby cool the first cooling target CT1 and the component to be cooled CC.

Configuration of the Flow Pipes

The plurality of flow pipes 75 are tubular members annularly connecting the first heat receiver 71, the second heat receiver 72, the reserver 73, and the supply section 74 and the heat exchanger 8. The liquid refrigerant flows on the insides of the plurality of flow pipes 75. The plurality of flow pipes 75 include a first flow pipe 751, a second flow pipe 752, a third flow pipe 753, a fourth flow pipe 754, and a fifth flow pipe 755.

The first flow pipe 751 connects the heat exchanger 8 and the first heat receiver 71. The second flow pipe 752 connects the first heat receiver 71 and the second heat receiver 72. The third flow pipe 753 connects the second heat receiver 72 and the reserver 73. The fourth flow pipe 754 connects the reserver 73 and the supply section 74. The fifth flow pipe 755 connects the supply section 74 and the heat exchanger 8.

The plurality of flow pipes 75 are formed of a material other than metal such as synthetic resin in this embodiment but may be formed of metal.

In this way, the second circulation device 7A includes a refrigerant circulation channel CP in which the liquid refrigerant; flows in the first heat receiver 71, the second heat receiver 72, the reserver 73, the supply section 74, and the heat exchanger 8 in order and flows into the first heat receiver 71 again. That is, the first heat receiver 71, the second heat receiver 72, the reserver 73, the supply section 74, and the heat exchanger 8 are provided in the refrigerant circulation channel CP.

Configuration of the First Heat Receiver

The first heat receiver 71 is heat-transferably connected to the first cooling target CT1. The first heat receiver 71 receives the heat of the first cooling target CT1. The liquid refrigerant flows into the first heat receiver 71 from the heat exchanger 8 via the first flow pipe 751. The liquid refrigerant flows on the inside of the first heat receiver 71. The first heat receiver 71 cools the first cooling target CT1 by transferring the heat received from the first cooling target CT1 to the liquid refrigerant. The first heat receiver 71 causes the liquid refrigerant, to which the heat of the first cooling target CT1 is transferred, to flow out to the second flow pipe 752.

Figure 5:
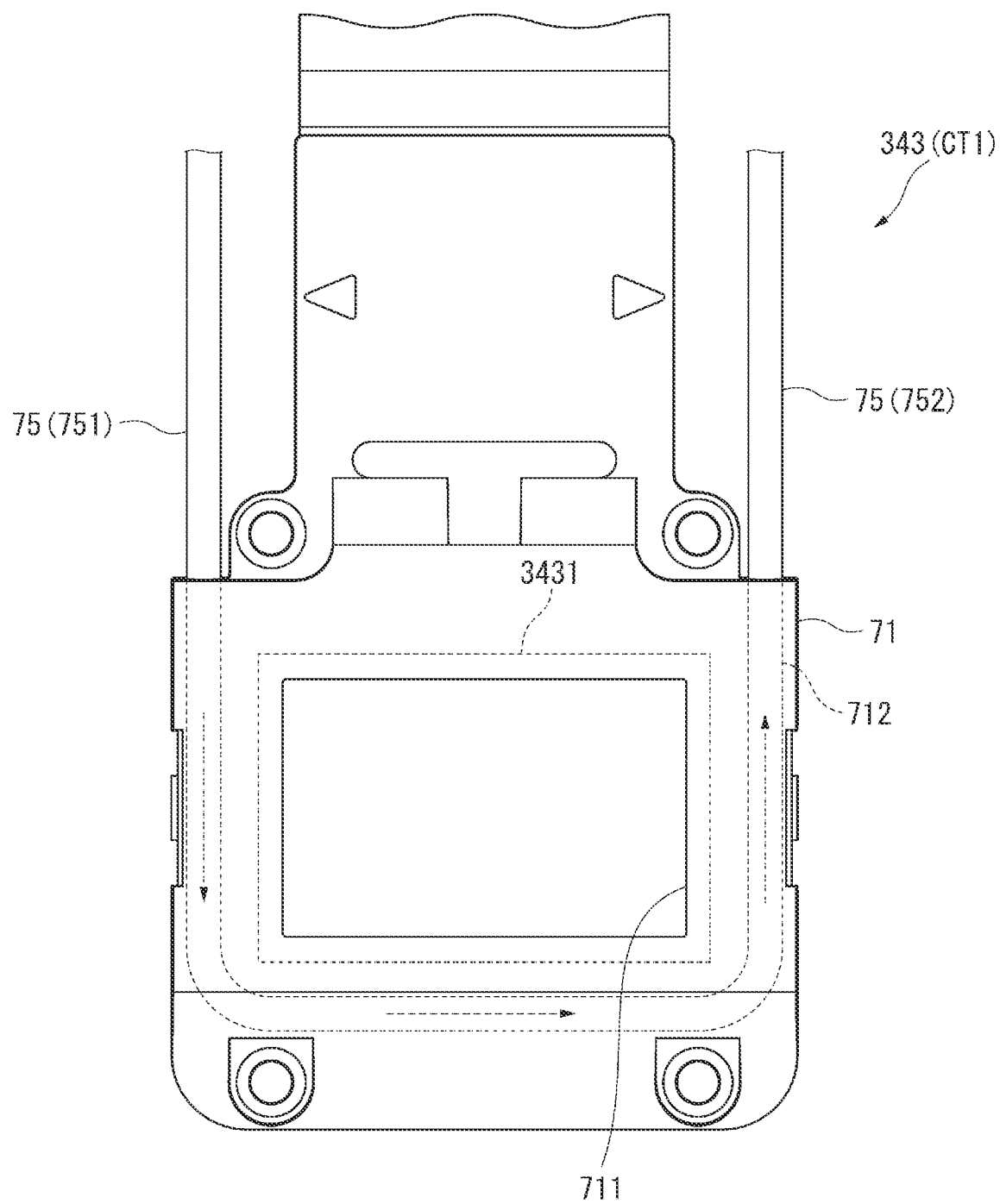
FIG. 5 is a diagram showing a light modulator, which is an example of a first cooling target, and a first heat receiver in the first embodiment.

FIG. 5 is a diagram showing the light modulator 343, which is an example of the first cooling target CT1, and the first heat receiver 71.

In this embodiment, as shown in FIG. 5, the first heat receiver 71 is configured as a holding member made of metal that holds a substantially rectangular liquid crystal panel 3431 configuring the light modulator 343. The first heat receiver 71 receives the heat of the liquid crystal panel 3431. The first heat receiver 71 includes an opening section 711 and a channel 712.

The opening section 711 is an opening section through which light made incident on the liquid crystal panel 3431 passes.

The channel 712 extends to surround three directions of the liquid crystal panel 3431 when the first heat receiver 71 is viewed from a light incident side. The liquid refrigerant flows on the inside of the channel 712. Specifically, the channel 712 extends along a pair of short sides and one long side of a pair of long sides of the liquid crystal panel 3431. One end of the channel 712 is connected to the first flow pipe 751. The other end of the channel 712 is connected to the second flow pipe 752. The heat of the liquid crystal panel 3431 received by the first heat receiver 71 is transferred to the liquid refrigerant flowing into the channel 712 from the first flow pipe 751, whereby the liquid crystal panel 3431 is cooled. The liquid refrigerant, to which the heat of the liquid crystal panel 3431 is transferred, is discharged to the second flow pipe 752.

Although detailed illustration is omitted, the first heat receiver 71 configured as the holding member is provided in each of the light modulators 343. That is, the liquid crystal panel 3431 of the light modulator 343B is held by the first heat receiver 71 for blue light, the liquid crystal panel 3431 of the light modulator 343G is held by the first heat receiver 71 for green light, and the liquid crystal panel 3431 of the light modulator 343R is held by the first heat receiver 71 for red light. The three first heat receivers 71 may be connected in parallel to the heat exchanger 3 or may be connected in series to the heat exchanger 3. When the three first heat receivers 71 are connected in series, the three first heat receivers 71 may be connected to the heat exchanger 8, for example, in order of easiness of a rise in temperature or in order of weakness to high temperature.

Configuration of the Second Heat Receiver

The second heat receiver 72 is heat-transferably connected to the component to be cooled CC and receives the heat of the component to be cooled CC. The liquid refrigerant flows into the second heat receiver 72 from the first heat receiver 71 via the second flow pipe 752. The liquid refrigerant flows on the inside of the second heat receiver 72. The second heat receiver 72 transfers the heat received from the component to be cooled CC to the liquid refrigerant to thereby cool the component to be cooled CC and causes the liquid refrigerant, to which the heat of the component to be cooled CC is transferred, to flow out to the third flow pipe 753.

In the cooling device 5A, as shown in FIG. 4, the second heat receiver 72 is provided in a path from the first heat receiver 71 to the reserver 73 in a flowing direction of the liquid refrigerant in the refrigerant circulation channel CP. The second heat receiver 72 may be provided in any path in the refrigerant circulation channel CP. That is, the second heat receiver 72 only has to be provided in any one of a path from the reserver 73 to the supply section 74, a path from the supply section 74 to the heat exchanger 8, and a path from the heat exchanger 8 to the first heat receiver 71 in the flowing direction of the liquid refrigerant in the refrigerant circulation channel CP.

The second heat receiver 72 may be provided in the fluid circulation channel FC of the first circulation device 6A. That is, the first circulation device 6A includes a second heat receiver in which the working fluid flows. The second heat receiver may be disposed in a path from the expander 63 to the compressor 61 in the flowing direction of the working fluid in the fluid circulation channel FC. For example, as shown in FIG. 4, the second heat receiver may be provided in a path ST1 from the heat exchanger 3 to the compressor 61 in the flowing direction of the working fluid in the fluid circulation channel FC.

Configurations of the Reserver and the Supply Section

The reserver 73 temporarily stores, on the inside, the liquid refrigerant flowing from the second heat receiver 72 via the third flow pipe 753. When the reserver 73 is formed of metal, the reserver 73 stores the liquid refrigerant and radiates the heat of the stored liquid refrigerant.

The supply section 74 sucks the liquid refrigerant stored in the reserver 73 and supplies the sucked liquid refrigerant to the heat exchanger 8. The supply section 74 supplies the liquid refrigerant, whereby the liquid refrigerant circulates in the refrigerant circulation channel CP.

Configuration of the Heat Exchanger

Figure 6:
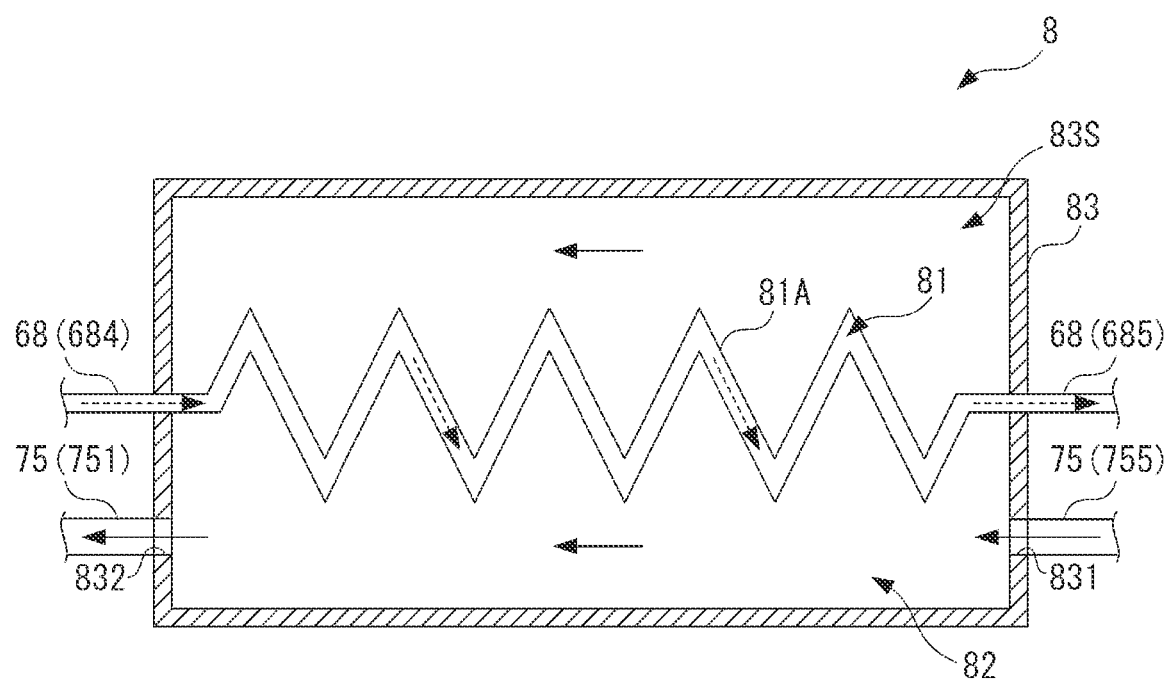
FIG. 6 is a schematic diagram showing an internal configuration of a heat exchanger in the first embodiment.

FIG. 6 is a schematic diagram showing an internal configuration of the heat exchanger 8.

The heat exchanger 8 is provided across the fluid circulation channel FC and the refrigerant circulation channel CP. Both of the working fluid circulating in the fluid circulation channel FC and the liquid refrigerant circulating in the refrigerant circulation channel CP flow in the heat exchanger 3. The heat exchanger 3 transfers the heat of the liquid refrigerant to the working fluid to thereby cool the liquid refrigerant. In other words, the heat exchanger 8 cools, with the working fluid flowing in the fluid circulation channel FC, the liquid refrigerant flowing in the refrigerant circulation channel CP.

The heat exchanger 8 includes, as shown in FIG. 6, a first channel 81, a second channel 62, and a housing 83 in which the first channel 81 and the second channel 82 are provided.

The housing 83 is a channel housing in which a space 83S is formed. The housing 83 includes an inflow port 831 and an outflow port 832.

The inflow port 831 and the outflow port 832 are communication ports that cause the outside of the housing 83 and the space 83S to communicate. The inflow port 831 and the outflow port 832 are formed in surfaces on opposite sides each other in the housing 83. The fifth flow pipe 755 is connected to the inflow port 831. The first flow pipe 751 is connected to the outflow port 832. The liquid refrigerant flows into the space 83S from the fifth flow pipe 755 via the inflow port 831. The liquid refrigerant having flowed in the space 83S flows out to the first flow pipe 751 from the outflow port 832.

The second channel 82 in which the liquid refrigerant flows is formed by the space 83S on the inside of such a housing 83. That is, the second channel 82 is a channel in which the liquid refrigerant having flowed in the first heat receiver 71 flows.

The first channel 81 is a channel in which the working fluid having flowed in the expander 63 flows. The first channel 81 is formed by the tubular member 81A provided in the space 83S. One end of the tubular member 81A is connected to the fourth pipe 684. The other end of the tubular member 31A is connected to the fifth pipe 685. The working fluid flowing into the tubular member 81A from the fourth pipe 684 passes through the first channel 81 and flows to the fifth pipe 685.

Such a tubular member 81A is covered by the liquid refrigerant in a state in which the liquid refrigerant is flowing into the space 83S. That is, the second channel 32 is the space 83S surrounding the first channel 81. In an example shown in FIG. 6, the tubular member 81A meanders in the housing 83. However, the tubular member 81A may linearly extend.

In the heat exchanger 8, the working fluid flows in the first channel 81 and the liquid refrigerant flows in the second channel 82, whereby the heat of the liquid refrigerant is transferred to the working fluid via the tubular member 81A surrounded by the liquid refrigerant. Consequently, the liquid refrigerant is cooled. That is, the heat exchanger 8 cools, with the working fluid flowing in the first channel 81, the liquid refrigerant flowing in the second channel 82.

Action of the Cooling Device

As explained above, in the cooling device 5A, the first cooling target CT1 is cooled and the liquid refrigerant circulating in the refrigerant circulation channel CP is cooled by the working fluid circulating in the fluid circulation channel FC. The cooled liquid refrigerant flows to the first heat receiver 71 and the second heat receiver 72 and the heat of the first cooling target CT1 and the heat of the component to be cooled CC are transferred to the liquid refrigerant, whereby the first cooling target CT1 and the component to be cooled CC are cooled.

Effects in the First Embodiment

The projector 1A according to this embodiment explained above can achieve the following effects.

The projector 1A modulates the light emitted from the light source 411 with the light modulators 343 and projects the modulated light with the projection optical device 36. The projector 1A includes the first cooling target CT1, the cooling device 5A that cools the first cooling target CT1, and the exterior housing 2 that houses the first cooling target CT1 and the cooling device 5A.

The cooling device 5A includes the first circulation device 6A in which the working fluid circulates, the second circulation device 7A in which the liquid refrigerant circulates, and the heat exchanger 3 in which both of the working fluid and the liquid refrigerant flow.

The first circulation device 6A includes the compressor 61 functioning as the first compressor, the condenser 62, the expander 63 functioning as the first expander, and the evaporator 64 functioning as the first evaporator.

The compressor 61 compresses the working fluid in the gas phase.

The condenser 62 condenses the working fluid in the gas phase compressed by the compressor 61 into the working fluid in the liquid phase.

The expander 63 decompresses the working fluid in the liquid phase condensed by the condenser 62 and changes the state of the working fluid to the mixed state of the liquid phase and the gas phase.

The evaporator 64 changes the working fluid flowing from the expander 63 to the working fluid in the gas phase with the heat transferred from the first cooling target CT1 and discharges the changed working fluid in the gas phase to the compressor 61.

The second circulation device 7A includes the first heat receiver 71.

The first heat receiver 71 is heat-transferably connected to the first cooling target CT1. The liquid refrigerant flows on the inside of the first heat receiver 71.

The heat exchanger 8 includes the first channel 81 in which the working fluid having flowed in the expander 63 flows and the second channel 82 in which the liquid refrigerant having flowed in the first heat receiver 71 flows. The liquid refrigerant flowing in the second channel 82 is cooled by the working fluid flowing in the first channel 81.

With such a configuration since the cooling device 5A is provided in the exterior housing 2 together with the first cooling target CT1, compared with when a part of the cooling device 5A is provided on the outside of the exterior housing 2 it is possible to easily carry out setting of the projector 3A. It is possible to make the exterior of the projector 1A satisfactory and configure the projector 1A to be small. It is possible to easily move the projector 1A.

Further, the evaporator 64 of the first circulation device 6A changes the working fluid in the liquid phase to the working fluid in the gas phase using the heat of the first cooling target CT1, whereby the first cooling target CT1 is cooled. The liquid refrigerant cooled by heat exchange with the working fluid in the heat exchanger 8 flows to the first heat receiver 71 heat-transferably connected to the first cooling target CT1, whereby the first cooling target CT1 is cooled. Consequently, for example, compared with when the liquid refrigerant cooled by heat exchange, with air flows to the first heat receiver 71, it is possible to cause the liquid refrigerant having low temperature to flow to the first heat receiver 71. Therefore, it is possible to improve cooling efficiency of the first cooling target CT1.

The heat exchanger 8 includes the housing 83 functioning as the channel housing in which the first channel 81 and the second channel 82 are provided. The second channel 82 is configured by the space S3S surrounding the first channel 81.

With such a configuration, the second channel 82 surrounds the first channel 81 on the inside of the housing 83. In other words, the first channel 81 is surrounded by the liquid refrigerant flowing on the inside of the second channel 82. Consequently, compared with a configuration in which a tubular member forming the first channel 81 and a tubular member forming the second channel 82 are in contact, it is possible to make it easy to transfer the heat of the liquid refrigerant flowing in the second channel 82 to the working fluid flowing in the first channel 81. Therefore, it is possible to efficiently cool the liquid refrigerant and efficiently cool the first cooling target CT1.

The projector 1A includes the component to be cooled CC different from the first cooling target. The second circulation device 7A includes the second heat receiver 72 heat-transferably connected to the component to be cooled CC, the liquid refrigerant flowing on the inside of the second heat receiver 72.

With such a configuration, the liquid refrigerant flows to the second heat receiver 72 to which the heat of the component to be cooled CC is transferred, whereby the component to be cooled CC can be cooled. Therefore, since it is unnecessary to individually provide a cooling device for each of the first cooling target CT1 and the component to be cooled CC, it is possible to simplify the configuration of the projector 1A. Besides, since the cooling device 5A can cool the first cooling target CT1 and the component to be cooled CC, it is possible to improve versatility of the cooling device 5A.

As explained above, in the projector 1A, the first, circulation device 6A may include the second heat receiver 12 heat-transferably connected to the component to be cooled CC, the working fluid flowing on the inside of the second heat receiver 72. In this case, the second heat receiver 72 may be disposed in the path from the expander 63 to the compressor 61 in the flowing direction of the working fluid.

With such a configuration, the working fluid flows to the second heat receiver 72 to which the heat of the component to be cooled CC is transferred, whereby the component to be cooled CC can be cooled. Therefore, as explained above, it is possible to simplify the configuration of the projector 1A and improve the versatility of the cooling device 5A.

The projector 1A includes the power supply device PS that supplies electric power. The component to be cooled CC is the power supply device PS.

With such a configuration, since it is unnecessary to individually provide a cooling device for each of the first cooling target CT1 and the power supply device PS, it is possible to simplify the configuration of the projector 1A. Besides, since the cooling device 5A can cool the first cooling target CT1 and the power supply device PS, it is possible to improve the versatility of the cooling device 5A. Such effects can also be achieved even when the component to be cooled CC is, for example, the control device CD that controls the operation of the projector 1A.

The projector 1A includes the light modulators 343 that modulate light emitted from the light source 411. The first cooling target CT1 is the light modulators 343.

With such a configuration, it is possible to effectively cool the light modulators 343.

Second Embodiment

A second embodiment of the present disclosure is explained.

A projector according to this embodiment has the same configuration as the configuration of the projector 1A according to the first embodiment. However, the projector is different from the projector 1A according to the first embodiment in that an evaporator and a first cooling target are disposed in a housing and a cooling gas cooled by the evaporator circulates in the housing, whereby the first cooling target is cooled. In the following explanation, the same or substantially the same portions as the portions explained above are denoted by the same reference numerals and signs and explanation of the portions is omitted.

Figure 7:
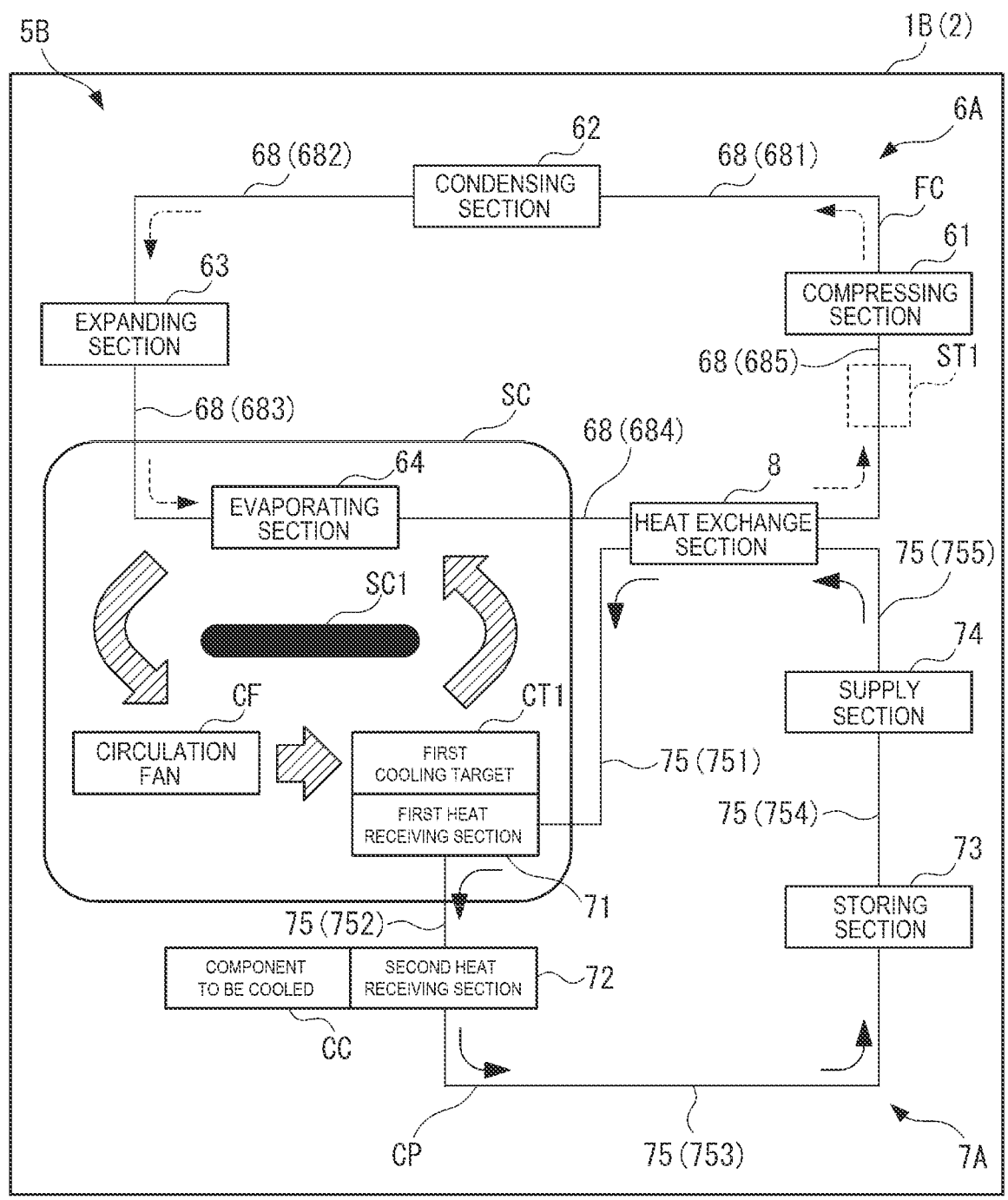
FIG. 7 is a schematic diagram showing a cooling device of a projector in a second embodiment.

FIG. 7 is a schematic diagram showing the configuration of a cooling device 5B included in a projector 1B according to this embodiment.

The projector 1B according to this embodiment has the same configuration and the same functions as the configuration and the function of the projector 1A according to the first embodiment except that the projector includes the cooling device 5B shown in FIG. 7 instead of the cooling device 5A according to the first embodiment and includes a sealed housing SC functioning as the housing and a circulation fan CF.

Like the cooling device 5A, the cooling device 5B cools the first cooling target CT1 and the second cooling target CT2. The cooling target 5B includes the first circulation device 6A, the second circulation device 7A, and the heat exchanger 8. In this embodiment, the evaporator 64 configuring the first circulation device 6A and the first cooling target CT1 are disposed on the inside of the sealed housing SC.

The sealed housing SC houses, on the inside, the first cooling target CT1 including the incident-side polarizing plate 342, the light modulators 343, the viewing angle compensating plates 344, the emission-side polarizing plate 345, and the color combining section 346. The evaporator 64 disposed in the sealed housing SC performs heat exchange between the cooling gas and the working fluid, whereby the cooling gas in the sealed housing SC is cooled.

A partition wall SC1 is provided in the sealed housing SC. The cooling gas cooled by the evaporator 64 is circulated in the sealed housing SC by the circulation fan CF along a gas circulation channel formed by the partition wall SC1 and flows to the first cooling target CT1. Consequently, the first cooling target CT1 is cooled by the cooling gas in the sealed housing SC. That is, the evaporator 64 cools the cooling gas in the sealed housing SC and cools the first cooling target CT1.

Further, as in the cooling device 5A, the first heat receiver 71 is heat-transferably connected to the first cooling target CT1 and the liquid refrigerant circulating in the refrigerant circulation channel CP flows to the first heat receiver 71. The first heat receiver 71 transfers heat transferred from the first cooling target CT1 to the liquid refrigerant, whereby the first cooling target CT1 is cooled.

Effects in the Second Embodiment

With the projector 1B according to this embodiment explained above, the same effects as the effects of the projector 1A according to the first embodiment can be achieved. Besides, the following effects can be achieved.

The projector 1B includes the sealed housing SC functioning as the housing in which the first cooling target CT1 and the evaporator 64 functioning as the first evaporator are disposed. The evaporator 64 cools the cooling gas in the sealed housing SC and cools the first cooling target CT1.

An optical component such as a light modulator needs to be accurately disposed in a predetermined position. That is, the disposition position of the optical component needs to be finely adjusted. Therefore, when such an optical component is the first cooling target CT1, a pipe connected to the evaporator 64 is requested to be flexible in order to connect the evaporator 64 to the first cooling target CT1. However, since the pressure of the working fluid flowing in the pipe is relatively high, it is difficult from the viewpoint of the strength of the pipe to adopt a flexibly displaceable pipe as the pipe 68 forming the fluid circulation channel FC. That is, it is difficult to heat-transferably connect the evaporator 64 to the first cooling target CT1 such as the optical component.

In contrast, with the configuration explained above, since the cooling gas cooled by the evaporator 64 cools the first cooling target CT1 in the sealed housing SC, it is unnecessary to physically connect the first cooling target CT1 and the evaporator 64. Accordingly, the liquid refrigerant flows to the first heat receiver 71, whereby the first cooling target CT1 can be cooled. The cooling gas flows to the first cooling target CT1, whereby the first cooling target CT1 can be cooled. Therefore, it is possible to, while improving cooling efficiency of the first cooling target CT1, simply configure the cooling device 5B capable of cooling the first cooling target CT1.

The first cooling target CT1 and the evaporator 64 are provided in the sealed housing SC. Therefore, it is possible to prevent the temperature of the cooling gas from rising with the heat on the outside of the sealed housing SC. Besides, it is possible to improve dust resistance of the first cooling target CT1 and the evaporator 64.

Third Embodiment

A third embodiment of the present disclosure is explained.

A projector according to the third embodiment has the same configuration as the configuration of the projector 1A according to the first embodiment. However, the projector is different from the projector 1A according to the first embodiment in that a first circulation device configuring a cooling device further includes a second expander, a second evaporator, and a second compressor provided in the fluid circulation channel FC. In the following explanation, the same or substantially the same portions as the portions explained above are denoted by the same reference numerals and signs and explanation of the portions is omitted.

Figure 8:
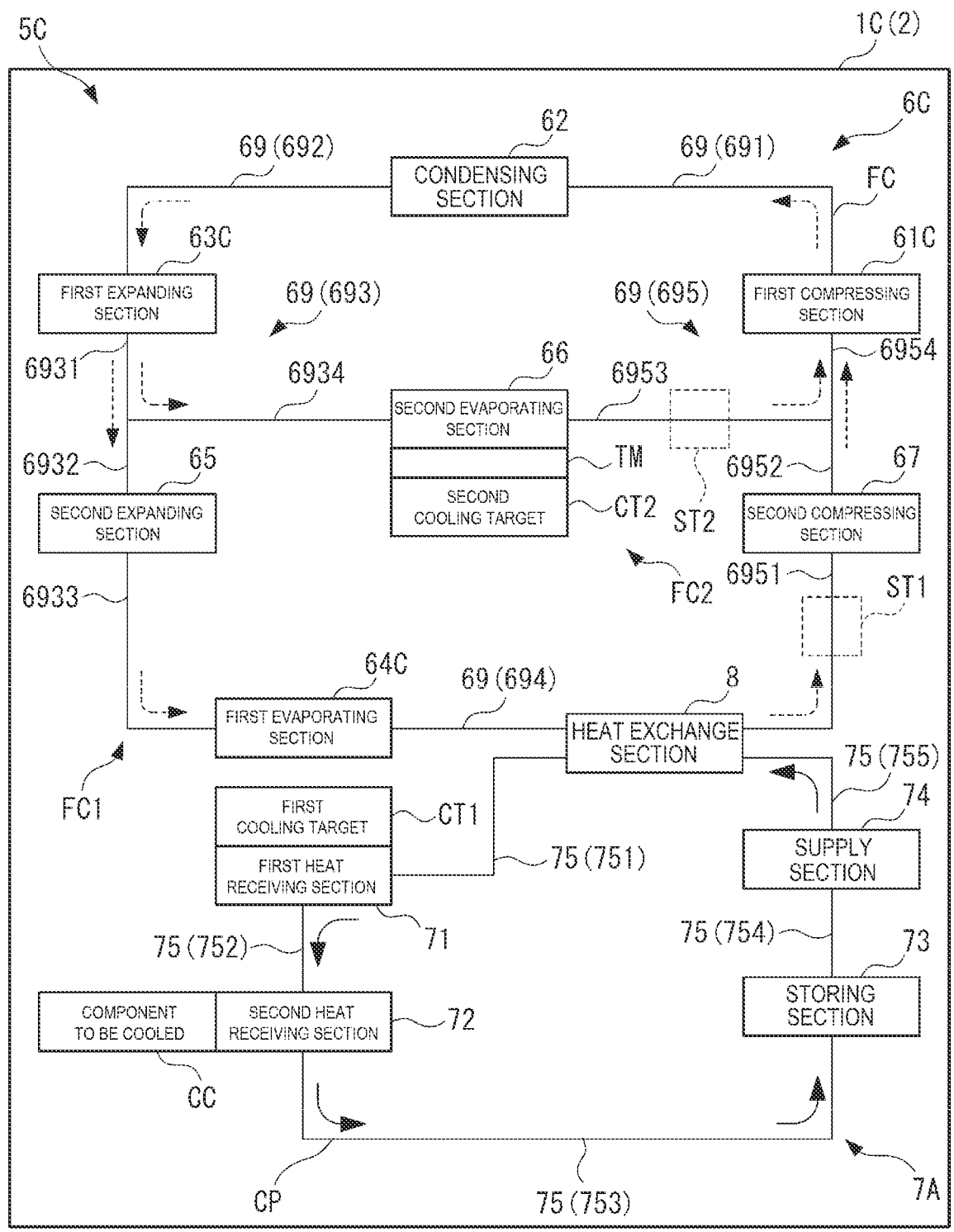
FIG. 8 is a schematic diagram showing a cooling device of a projector in a third embodiment.

FIG. 8 is a schematic diagram showing the configuration of a cooling device 5C included in a projector 1C according to this embodiment.

The projector 1C according to this embodiment has the same configuration and the same function as the configuration and the function of the projector 1A according to the first embodiment except that the projector 1C includes the cooling device 5C shown in FIG. 8 instead of the cooling target 5A according to the first embodiment. The cooling target 5C includes a first circulation device 6C, the second circulation device 7A, and the heat exchanger 8. Cooling targets of the cooling device 5C include the first cooling target CT1 and the second cooling target CT2 different from the first cooling target CT1.

Configuration of the First Circulation Device

The first circulation device 6C circulates working fluid and cools the first cooling target CT1 and the second cooling target CT2. The first circulation device 6C includes a first compressor 61C, the condenser 62, a first expander 63C, a first evaporator 64C, a second expander 65, a second evaporator 66, and a second compressor 67 and a plurality of pipes 69. That is, the first compressor 61C, the condenser 62, the first expander 63C, the first evaporator 64C, the heat exchanger 8, the second expander 65, the second evaporator 66, and the second compressor 67 are provided in the fluid circulation channel FC.

Configuration of the Pipes

The plurality of pipes 69 annularly connect the first compressor 61C, the condenser 62, the first expander 63C, and the second evaporator 66 and annularly connect the first compressor 61C, the condenser 62, the first expander 63C, the second expander 65, the first evaporator 64C, the heat exchanger 8, and the second compressor 67. The working fluid flows on the insides of the plurality of pipes 69. The plurality of pipes 69 include a first pipe 691, a second pipe 692, a third pipe 693, a fourth pipe 694, and a fifth pipe 695.

The first pipe 691 connects the first compressor 61C and the condenser 62. The second pipe 692 connects the condenser 62 and the first expander 63C. The first pipe 691 and the second pipe 692 are formed of a material having relatively high strength against the working fluid having relatively high pressure, for example, metal.

The fourth pipe 694 connects the first evaporator 64C and the first channel 81 of the heat exchanger 8.

The third pipe 693 is a tubular member that is equivalent to a first connection pipe and connects the first expander 63C and the first evaporator 64C via the second expander 65 and connects the first expander 630 and the second evaporator 66. The third pipe 693 includes a flow dividing pipe 6931, branch pipes 6932 and 6934, and a partial pipe 6933. The third pipe 693 divides the working fluid flowing into the third pipe 693 from the first expander 630 and causes the working fluid to flow to the second expander 65 and the second evaporator 66.

The flow dividing pipe 6931 connects the first expander 630 and the branch pipes 6932 and 6934. The flow dividing pipe 6931 divides, toward the branch pipe 6932 and the branch pipe 6934, the working fluid flowing into the flow dividing pipe 6931 from the first expander 630.

The branch pipe 6932 connects the flow dividing pipe 6931 and the second expander 65. The branch pipe 6932 causes a part of the working fluid divided by the flow dividing pipe 6931 to flow to the second expander 65.

The partial pipe 6933 connects the second expander 65 and the first evaporator 64C. The partial pipe 6933 causes the working fluid flowing out from the second expander 65 to flow to the first evaporator 64C.

The branch pipe 6934 connects the flow dividing pipe 6931 and the second evaporator 66. The branch pipe 6934 causes the other working fluid of the working fluid flowing into the flow dividing pipe 6931 to flow to the second evaporator 66.

The fifth pipe 695 is a tubular member that is equivalent to a second connection pipe and connects the heat exchanger 8 and the first compressor 61C via the second compressor 67 and connects the second evaporator 66 and the first compressor 61C. The fifth pipe 695 includes a partial pipe 6951, branch pipes 6952 and 6953, and a flow joining pipe 6954. The fifth pipe 695 joins the working fluid flowing into the fifth pipe 695 from the second compressor 67 and the working fluid flowing into the fifth pipe 695 from the second evaporator 66 and causes the working fluid to flow to the first compressor 61C.

The partial pipe 6951 connects the heat exchanger 8 and the second compressor 67. The partial pipe 6951 causes the working fluid flowing out from the first channel 81 of the heat exchanger 8 to flow to the second compressor 67.

The branch pipe 6952 connects the second compressor 67 and the flow joining pipe 6954.

The branch pipe 6953 connects the second evaporator 66 and the flow joining pipe 6954.

The flow joining pipe 6954 connects the branch pipes 6952 and 6953 and the first compressor 61C. The flow joining pipe 6954 joins the working fluid flowing into the flow joining pipe 6954 from the second compressor 67 via the branch pipe 6952 and the working fluid flowing into the flow joining pipe 6954 from the second evaporator 66 via the branch pipe 6953 and causes the working fluid to flow to the first compressor 61C.

Configurations of the First Compressor, the Condenser, and the First Expander

Like the compressor 61 according to the first and second embodiments, the first compressor 61C compresses the working fluid in the gas phase. Specifically, the first compressor 61C compresses the working fluid flowing into the first compressor 61C from the second compressor 67 and the second evaporator 66 via the fifth pipe 695 and discharges the compressed working fluid to the condenser 62 via the first pipe 691.

Like the condenser 62 according to the second embodiment, the condenser 62 condenses the working fluid flowing into the condenser 62 via the first pipe 691 into the working fluid in the liquid phase. The condenser 62 discharges the condensed working fluid to the first expander 63C via the second pipe 692.

Like the expander 63 according to the first and second embodiments, the first expander 63C is a decompressor. The first expander 63C decompresses the working fluid in the liquid phase condensed by the condenser 62 and changes a state of the working fluid to a mixed state of the liquid phase and the gas phase. Like the expander 63, the first expander 63C can be configured by an expansion valve or a capillary tube.

Configuration of the Second Expander

The second expander 65 is the same decompressor as the first expander 63C. The second expander 65 is connected to the first expander 63C via the flow dividing pipe 6931 and the branch pipe 6932 configuring the third pipe 693. The other working fluid in the mixed state of the liquid phase and the gas phase flows into the second expander 65 from the first expander 63C. The second expander 65 further decompresses the working fluid decompressed by the first expander to thereby further lower the temperature of the working fluid. That is, the temperature of the working fluid flowing out from the second expander 65 is lower than the temperature of the working fluid flowing out from the first expander 63C. The second expander 65 discharges the decompressed working fluid to the first evaporator 64C via the partial pipe 6933.

As such a second expander 65, like the first expander 63C, an expansion valve or a capillary tube can be adopted.

When each of the first expander 63C and the second expander 65 is configured by an expansion valve, an opening degree of the expansion valve configuring the first expander 63C and an opening degree of the expansion valve configuring the second expander 65 can be individually adjusted. Accordingly, the temperature of the working fluid flowing out from the first expander 63C and the temperature of the working fluid flowing out from the second expander 65 can be individually adjusted.

Configuration of the First Evaporator

The first evaporator 64C is connected to the second expander 65 via the partial pipe 6933 and connected to the heat exchanger 8 via the fourth pipe 694. The working fluid decompressed by the second expander 65 flows into the first evaporator 64C via the fourth pipe 694.

The first evaporator 64C functions in the same manner as the evaporator 64 according to the first and second embodiments. That is, the first evaporator 64C is disposed at an interval from the first cooling target CT1. The first evaporator 64C evaporates, with heat transferred from the first cooling target CT1, the working fluid in the liquid phase flowing from the first expander 63C and changes the working fluid in the liquid phase to the working fluid in the gas phase. The first evaporator 64C discharges the changed working fluid in the gas phase to the second compressor 67 via the fourth pipe 694, the heat exchanger 8, and the partial pipe 6951. Consequently, the heat of the first cooling target CT1 is consumed and the first cooling target CT1 is cooled.

Configuration of the Second Evaporator

The second evaporator 66 is connected to the first expander 63C via the flow dividing pipe 6931 and the branch pipe 6934. That is, the second evaporator 66 is provided in parallel to the second expander 65 with respect to the first expander 63C in the fluid circulation channel FC. Apart of the working fluid in the mixed state of the liquid phase and the gas phase flows into the second evaporator 66 from the first expander 63C. The second evaporator 66 changes the working fluid flowing into the second evaporator 66 from the first expander 63C to the working fluid in the gas phase with heat transferred from the second cooling target CT2.

The second evaporator 66 is heat-transferably connected to the second cooling target CT2 via a heat transfer member TM. The heat of the second cooling target CT2 is transferred to the second evaporator 66 via the heat transfer member TM. The heat transfer member TM may be absent. The second evaporator 66 is directly connected to the second cooling target CT2.

The first cooling target CT1 may be a part of the image forming section 34 including the light modulators 343. The component to be cooled CC may be the power supply device PS or the control device CD. The second cooling target CT2 may be the light source 411.

For example, the second evaporator 66 is heat-transferably connected to the supporting member 414 of the light source 411 via the heat transfer member TM. The heat of the plurality of first semiconductor lasers 412 configuring the light source 411 and the heat of the plurality of second semiconductor lasers 413 configuring the light source 411 are transferred to the second evaporator 66 via the supporting member 414 and the heat transfer member TM.

The second evaporator 66 evaporates, with the heat transferred from the light source 411, a part of the working fluid in the liquid phase flowing from the first expander 63C and changes the working fluid in the liquid phase to the working fluid in the gas phase. Consequently, the heat of the plurality of first semiconductor lasers 412 and the plurality of second semiconductor lasers 413 is consumed and the plurality of first semiconductor lasers 412 and the plurality of second semiconductor lasers 413 are cooled.

The second evaporator 66 discharges the working fluid changed to the gas phase to the first compressor 61C via the branch pipe 6953 and the flow joining pipe 6954 of the fifth pipe 695.

When a heat value of the second cooling target CT2 is larger than a total value of a heat value of the first cooling target CT1 and a heat value of the component to be cooled CC, the flow dividing pipe 6931 of the third pipe 693 may set a flow rate of the working fluid flowing to the second evaporator 66 to be larger than a flow rate of the working fluid flowing to the first evaporator 64C via the second expander 65. When an allowable temperature range of the second cooling target CT2 is lower than at least one allowable temperature range of an allowable temperature range of the first cooling target CT1 and an allowable temperature range of the component to be cooled CC, similarly, the flow dividing pipe 6931 of the third pipe 693 may set the flow rage of the working fluid flowing to the second evaporator 66 larger than the flow rate of the working fluid flowing to the first evaporator 64C.

Configuration of the Second Compressor

The second compressor 67 is connected to the heat exchanger 8 via the partial pipe 6951 of the fifth pipe 695. The second compressor 67 is connected to the first compressor 61C via the branch pipe 6952 and the flow joining pipe 6954. The second compressor 67 compresses the working fluid in the gas phase flowing into the second compressor 67 from the first evaporator 64C via the heat exchanger 8. That is, the second compressor 67 raises the working fluid in the gas phase flowing into the second compressor 67 in temperature and pressure. The working fluid in the gas phase compressed by the second compressor 67 flows in the branch pipe 6952 of the fifth pipe 695, joins, in the flow joining pipe 6954, the working fluid in the gas phase flowing in the branch pipe 6953, and flows to the first compressor 61C. That is, the second compressor 67 discharges the compressed working fluid in the gas phase to the first compressor 61C via the branch pipe 6952 and the flow joining pipe 6954.

The second compressor 67 compresses the working fluid in the gas phase flowing into the second compressor 67 from the heat exchanger 8 such that the pressure of the working fluid in the gas phase flowing into the branch pipe 6952 from the second compressor 67 is substantially the same as the pressure of the working fluid in the gas phase flowing into the branch pipe 6953 from the second evaporator 66. That is, the pressure of the working fluid in the gas phase compressed by the second compressor 67 is substantially the same as the pressure of the working fluid in the gas phase discharged from the second evaporator 66. Consequently, it is possible to make it easy for the working fluid in the gas phase flowing in the branch pipe 6952 from the second compressor 67 and the working fluid in the gas phase flowing in the branch pipe 6953 from the second evaporator 66 to join in the flow joining pipe 6954 and flow to the first compressor 61C.

The driving frequency of the first compressor 61C and the driving frequency of the second compressor 67 are substantially the same. Consequently, it is possible to prevent noise occurring in the compressors 61C and 67 from increasing at timing when phases of the driving frequencies coincide. The driving frequency of the first compressor 61C and the driving frequency of the second compressor 67 being substantially the same includes the driving frequencies being the same.

In this way, the first circulation device 6C includes the fluid circulation channel FC in which the working fluid circulates. The fluid circulation channel FC is configured by a first fluid circulation channel FC1 and a second fluid circulation channel FC2.

The first fluid circulation channel FC1 is a circulation channel in which the working fluid flows in the first compressor 61C, the condenser 62, the first expander 63C, the second expander 65, the first evaporator 64C, the heat exchanger 8, and the second compressor 67 in order and flows into the first compressor 61C again. The working fluid circulates in the first fluid circulation channel FC1, whereby the first cooling target CT1 is cooled.

The second fluid circulation channel FC2 is a circulation channel in which the working fluid flows in the first compressor 61C, the condenser 62, the first expander 63C, and the second evaporator 66 in order and flows into the first compressor 61C again. The working fluid circulates in the second fluid circulation channel FC2, whereby the second cooling target CT2 is cooled.

The first compressor 61C, the first pipe 691, the condenser 62, the second pipe 692, and the first expander 63C are shared between the fluid circulation channels FC1 and FC2. That is, a path from the flow joining pipe 6954 of the fifth pipe 695 to the flow dividing pipe 6931 of the third pipe 693 is shared between the first fluid circulation channel FC1 and the second fluid circulation channel FC2 in the flowing direction of the working fluid.

In the cooling device 5C, the second heat receiver 72 may be disposed in a path from the first expander 63C to the first compressor 61C via the second evaporator 66 in the flowing direction of the working fluid in the fluid circulation channel FC of the first circulation device 6C in addition to the path of the liquid refrigerant in the refrigerant circulation channel CP of the second circulation device 7A. That is, the first circulation device 6C includes a second heat receiver in which the working fluid flows. For example, as shown in FIG. 8, the second heat receiver 72 may be provided in a path ST2 from the second evaporator 66 to the first compressor 61C in the flowing direction of the working fluid in the fluid circulation channel FC. The second heat receiver 72 may be disposed in a path from the first expander 63C to the second expander 65 or a path from the second compressor 67 to the first compressor 61C in the flowing direction of the working fluid in the fluid circulation channel FC.

Further, in the cooling device 5C, the second heat receiver 72 may be disposed in a path from the second expander 65 to the second compressor 67 in the flowing direction of the working fluid in the fluid circulation channel FC of the first circulation device 6C. For example, as shown in FIG. 8, the second heat receiver 72 may be provided in the path ST1 from the heat exchanger 8 to the second compressor 67 in the flowing direction of the working fluid in the fluid circulation channel FC.

Effects in the Third Embodiment

With the projector 1C according to this embodiment explained above, the same effects as the effects of the projector 1A according to the first embodiment can be achieved. Besides, the following effects can be achieved.

The projector 1C includes the second cooling target CT2 different from the first cooling target CT1. The first circulation device 6C includes the second expander 65, the second evaporator 66, and the second compressor 67 in addition to the first compressor 61C, the condenser 62, the first expander 63C, and the first evaporator 64C.

The second expander 65 decompresses the working fluid decompressed by the first expander 63C.

The second evaporator 66 changes the working fluid flowing from the first expander 63C to the working fluid in the gas phase with heat transferred from the second cooling target CT2.

The second compressor 67 compresses the working fluid flowing into the second compressor 67 from the first evaporator 64C via the heat exchanger 8 and discharges the compressed working fluid to the first compressor 61C.

With such a configuration, the second evaporator 66 changes the working fluid in the liquid phase to the working fluid in the gas phase using the heat of the second cooling target CT2. Accordingly, since the heat of the second cooling target CT2 is consumed by the second evaporator 66, the second cooling target CT2 can be cooled.

The first fluid circulation channel FC1 including the first evaporator 64C and the second fluid circulation channel FC2 including the second evaporator 66 share the first compressor 61C, the condenser 62, and the first expander 63C. Accordingly, it is possible to simplify the configuration of the cooling device 5C that can cool the first cooling target CT1 and the second cooling target CT2. Besides, compared with when the first fluid circulation channel FC1 and the second fluid circulation channel FC2 are individually provided, it is possible to configure the cooling device 5C to be small and configure the projector 1C to be small.

Fourth Embodiment

A fourth embodiment of the present disclosure is explained.

A projector according to the fourth embodiment has the same configuration as the configuration of the projector 1C according to the third embodiment. However, the projector is different from the projector 1C according to the third embodiment in that the first evaporator 64C and the first cooling target CT1 are disposed in a housing and a cooling gas cooled by the first evaporator 64C circulates in the housing, whereby the first cooling target CT1 is cooled. In the following explanation, the same or substantially the same portions as the portions explained above are denoted by the same reference numerals and signs and explanation of the portions is omitted.

Figure 9:
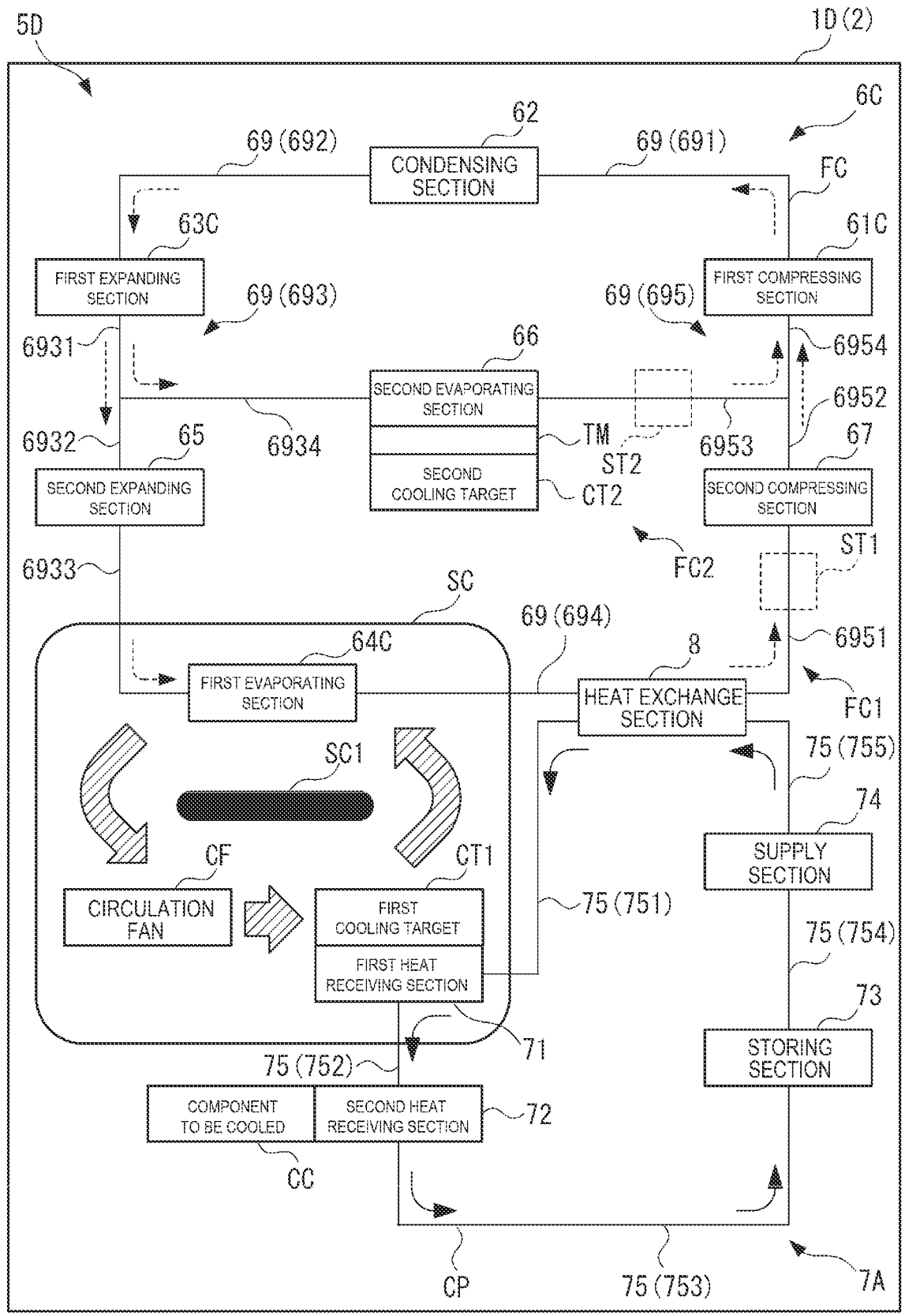
FIG. 9 is a schematic diagram showing a cooling device of a projector in a fourth embodiment.

FIG. 9 is a schematic diagram showing the configuration of a cooling device 5D included in a projector 1D according to this embodiment.

The projector 1D according to this embodiment has the same configuration and the same function as the configuration and the function of the projector 1C according to the third embodiment except that the projector 1D includes the cooling device 5D shown in FIG. 9 instead of the cooling device 5C according to the third embodiment and further includes the sealed housing SC functioning as the housing and the circulation fan CF as in the projector 1B according to the second embodiment.

Like the cooling device 5C, the cooling device 5D cools the first cooling target CT1, the second cooling target CT2, and the component to be cooled CC.

The cooling device 5D includes the first circulation device 60, the second circulation device 7A, and the heat exchanger 8. In the cooling device 5D, the first evaporator 64C configuring the first circulation device 6C and the first cooling target CT1 are disposed on the inside of the sealed housing SC.

As explained above, the sealed housing SC houses, on the inside, as the first cooling target CT1, a part of components including the light modulators 343 among the components of the image forming section 34. The cooling gas in the sealed housing SC is cooled by the first evaporator 64C. The first cooling target CT1 is cooled by the cooling gas in the sealed housing SC circulated by the circulation fan CF disposed on the inside of the sealed housing SC.

That is, in the cooling device 5D, the cooling gas in the sealed housing SC cooled by the first evaporator 64C flows, whereby the first cooling target CT1 is cooled. Besides, the heat of the first cooling target CT1 is transferred to the first heat receiver 71 in which the liquid refrigerant flows, whereby the first cooling target CT1 is cooled.

Effects in the Fourth Embodiment

With the projector 1D according to this embodiment explained above, the same effects as the effects of the projectors 1A, 1B, and 1C according to the first to third embodiments can be achieved.

Fifth Embodiment

A fifth embodiment of the present disclosure is explained.

A projector according to this embodiment has the same configuration as the configuration of the projector 1A according to the first embodiment. However, the projector is different from the projector 1A according to the first embodiment in that an evaporator and a heat exchanger are integrated. In the following explanation, the same or substantially the same portions as the portions explained above are denoted by the same reference numerals and signs and explanation of the portions is omitted.

Figure 10:
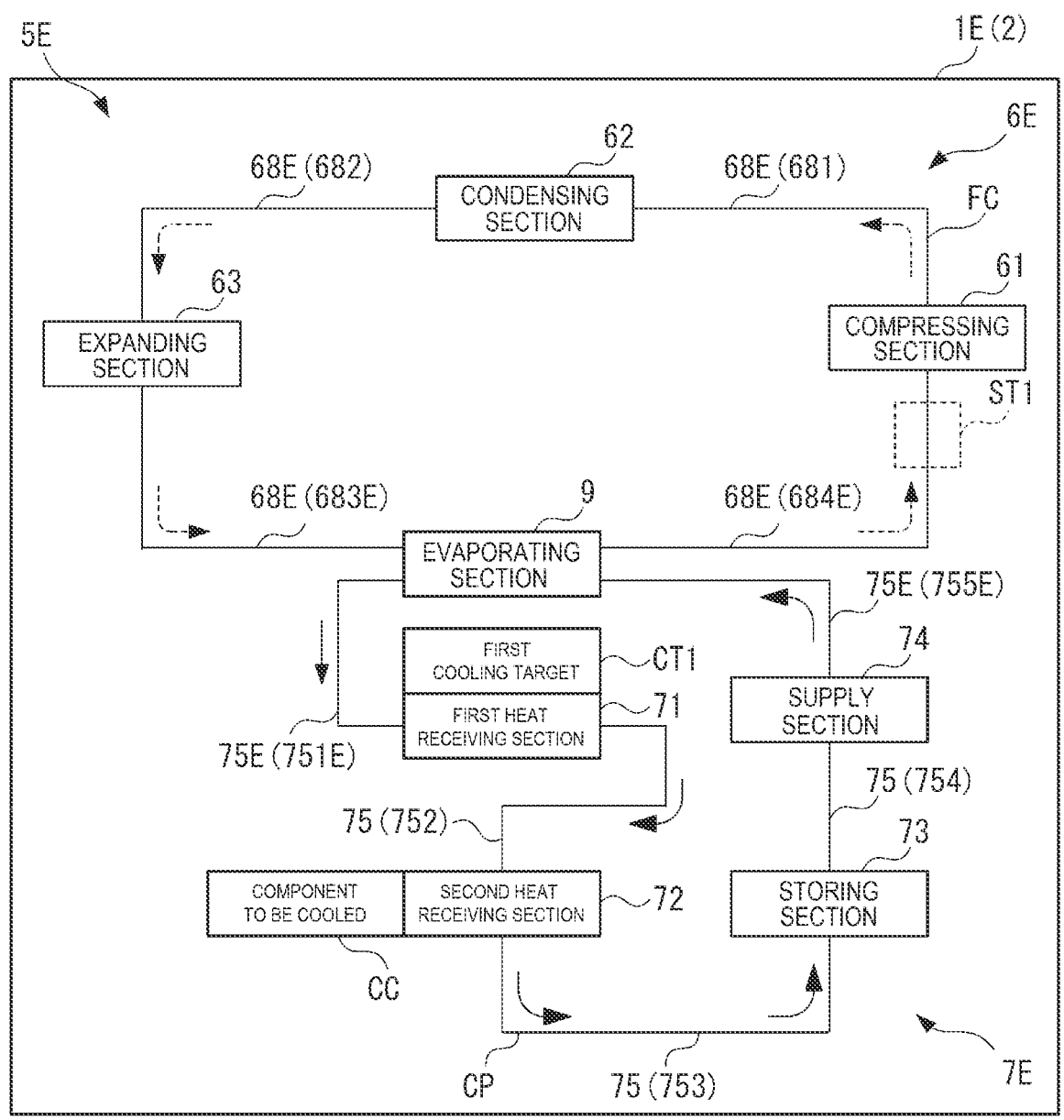
FIG. 10 is a schematic diagram showing a cooling device of a projector in a fifth embodiment.

FIG. 10 is a schematic diagram showing the configuration of a cooling device 5E included in a projector 1E according to this embodiment.

The projector 1E according to this embodiment has the same configuration and the same function as the configuration and the function of the projector 1A according to the first embodiment except that the projector 1E includes the cooling device 5E shown in FIG. 10 instead of the cooling device 5A according to the first embodiment. The cooling device 5E includes a first circulation device 6E and a second circulation device 7E and, like the cooling device 5A, cools the first cooling target CT1 and the component to be cooled CO.

Configuration of the First Circulation Device

Like the first circulation device 6A according to the first embodiment, the first circulation device 6E includes the fluid circulation channel FC in which working fluid circulates. The first circulation device 6E circulates the working fluid to thereby cool the first cooling target CT1 and a liquid refrigerant of the second circulation device 7e. The first circulation device 6E includes the compressor 61, the condenser 62, the expander 63, and an evaporator 9 and a plurality of pipes 68E.

Configuration of the Pipes

The plurality of pipes 68E are tubular members annularly connecting the compressor 61, the condenser 62, the expander 63, and the evaporator 9. The working fluid flows on the insides of the plurality of pipes 68E. The plurality of pipes 68E include the first pipe 681, the second pipe 682, a third pipe 683E, and a fourth pipe 684E.

As explained above, the first pipe 681 connects the compressor 61 and the condenser 62. The second pipe 682 connects the condenser 62 and the expander 63.

The third pipe 683E connects the expander 63 and the evaporator 9. The fourth pipe 684E connects the evaporator 9 and the compressor 61.

In this way, the first circulation device 6E includes the fluid circulation channel FC in which the working fluid flows in the compressor 61, the condenser 62, the expander 63, and the evaporator 9 in order and flows into the compressor 61 again. The plurality of pipes 68E can be formed of, for example, metal.

Another Configuration of the First Circulation Device

The compressor 61, the condenser 62, and the expander 63 function in the same manner as the compressor 61, the condenser 62, and the expander 63 in the first circulation device 6A according to the first, and second embodiments. The working fluid decompressed by the expander 63 flows to the evaporator 9 via the third pipe 683.

The evaporator 9 is equivalent to the first evaporator and the heat exchanger and has the function of the evaporator 64 according to the first and second embodiments and the function of the heat exchanger 8 according to the first to fourth embodiments. The configuration and the function of the evaporator 9 are explained in detail below.

Configuration of the Second Circulation Device

Like the second circulation device 7A according to the first to fourth embodiments the second circulation device 7E circulates the liquid refrigerant to thereby cool the first cooling target CT1 and a component to be cooled. The second circulation device 7E includes the first heat receiver 71 the second heat receiver 72 the reserver 73, and the supply section 74 and a plurality of flow pipes 75E.

Configuration of the Flow Pipes

The plurality of flow pipes 75E are tubular members annularly connecting the first heat receiver 71 the second heat receiver 72 the reserver 73 the supply section 74, and the evaporator 9. The liquid refrigerant flows on the insides of the plurality of flow pipes 75E. The plurality of circulation pipes 75E include a first flow pipe 751E, the second flow pipe 752, the third flow pipe 753, the fourth flow pipe 754, and a fifth flow pipe 755E. The plurality of flow pipes 75E can be formed of a material other than metal such as synthetic resin.

As explained above, the second flow pipe 752 connects the first heat receiver 71 and the second heat receiver 72. The third flow pipe 753 connects the second heat receiver 72 and the reserver 73. The fourth flow pipe 754 connects the reserver 73 and the supply section 74.

The first flow pipe 751E connects the evaporator 9 and the first heat receiver 71.

The fifth flow pipe 755E connects the supply section 74 and the evaporator 9.

In this way, the second circulation device 7E includes the refrigerant circulation channel CP in which the liquid refrigerant flows in the evaporator 9, the first heat receiver 71, the second heat receiver 72, the reserver 73, and the supply section 74 in order and flows into the evaporator 9 again.

Configuration of the Evaporator

Figure 11:
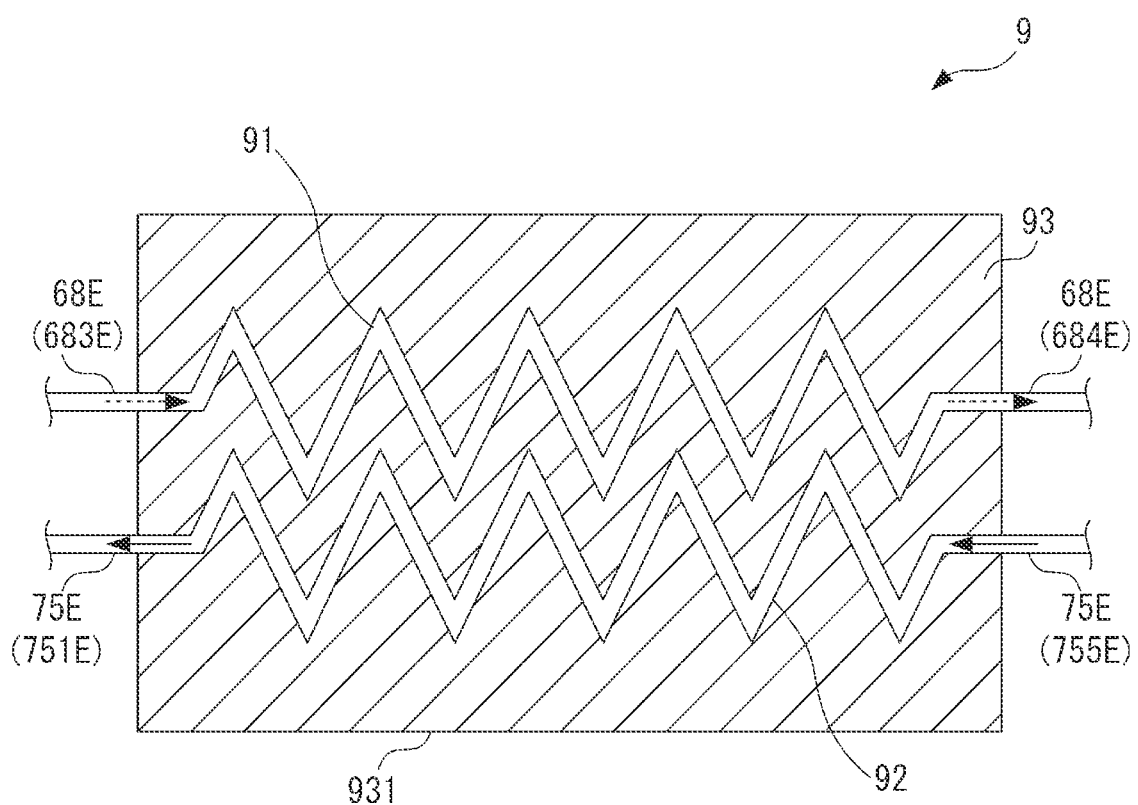
FIG. 11 is a schematic diagram showing an internal configuration of an evaporator in the fifth embodiment.

FIG. 11 is a schematic diagram showing an internal configuration of the evaporator 9.

The evaporator 9 is obtained by integrating the evaporator 64 and the heat exchanger 6 according to the first embodiment. The evaporator 9 is disposed at an interval from the first cooling target CT1. Like the heat exchanger 8 according to the first to fourth embodiments, the evaporator 9 is disposed across the fluid circulation channel FC and the refrigerant circulation channel CP. Both of the working fluid and the liquid refrigerant flow in the evaporator 9. The evaporator 9 changes the working fluid in the liquid phase to the working fluid in the gas phase with the heat transferred from the first cooling target CT1 and the heat transferred from the liquid refrigerant. The evaporator 9 consumes the heat of the first cooling target CT1 and the heat of the liquid refrigerant to thereby cool the first cooling target CT1 and the liquid refrigerant. In other words, the evaporator 9 cools, with the working fluid flowing in the fluid circulation channel FC, the liquid refrigerant flowing in the refrigerant circulation channel CP and the first cooling target CT1.

The evaporator 9 includes, as shown in FIG. 11, a first channel 91, a second channel 92, and a heat exchanger 93. That is, the cooling device 5E includes the heat exchanger 93.

The first channel 91 is connected to the third pipe 683E and the fourth pipe 684E. The working fluid flows into the first channel 91 from the expander 63 via the third pipe 683E. The working fluid having flowed in the first channel 91 is discharged to the compressor 61 via the fourth pipe 684E.

The second channel 92 is connected to the first flow pipe 751E and the fifth flow pipe 755E. The liquid refrigerant flows into the second channel 92 from the supply section 74 via the fifth flow pipe 755E. The liquid refrigerant having flowed in the second channel 92 flows to the first heat receiver 71 via the first flow pipe 751E.

In an example shown in FIG. 1I, the first channel 91 and the second channel 92 meander and extend. However, the first channel 91 and the second channel 92 may linearly extend.

The heat exchanger 93 is a metal body in which the first channel 91 and the second channel 92 are formed. The heat exchanger 93 includes a heat receiving surface 931 exposed to the outside. Like the evaporator 64 according to the first embodiment, the heat receiving surface 931 receives the heat transferred from the first cooling target CT1 via the cooling gas.

The heat exchanger 93 evaporates, with the heat transferred from the first cooling target CT1 and the heat of the liquid refrigerant flowing in the second channel 92, the working fluid in the liquid phase flowing in the first channel 91 and changes the working fluid in the liquid phase to the working fluid in the gas phase. Consequently, the heat of the first cooling target CT1 and the heat of the liquid refrigerant are consumed and the first cooling target CT1 and the liquid refrigerant are cooled. The liquid refrigerant flows and the first heat receiver 71 is cooled, whereby the first cooling target CT1 is also cooled.

Effects in the Fifth Embodiment

The projector 1E according to this embodiment explained above can achieve the same effects as the effects of the projector 1A according to the first embodiment. Besides, the projector 1E can achieve the following effects.

The evaporator 9 is obtained by integrating the evaporator 64 functioning as the first evaporator and the heat exchanger 8. The evaporator 9 changes the working fluid flowing in the first channel 91 to the working fluid in the gas phase with the heat of the first cooling target CT1 and the heat of the liquid refrigerant flowing in the second channel 92.

With such a configuration, it is possible to achieve a reduction in the size of the cooling device 5E and the size of the projector 1E.

Sixth Embodiment

A sixth embodiment of the present disclosure is explained.

A projector according to this embodiment has the same configuration as the configuration of the projector 1B according to the second embodiment. However, like the cooling device 5E according to the fifth embodiment, the projector is different from the projector 1B according to the second embodiment in that an evaporator and a heat exchanger are integrated. In the following explanation, the same or substantially the same portions as the portions explained above are denoted by the same reference numerals and signs and explanation of the portions is omitted.

Figure 12:
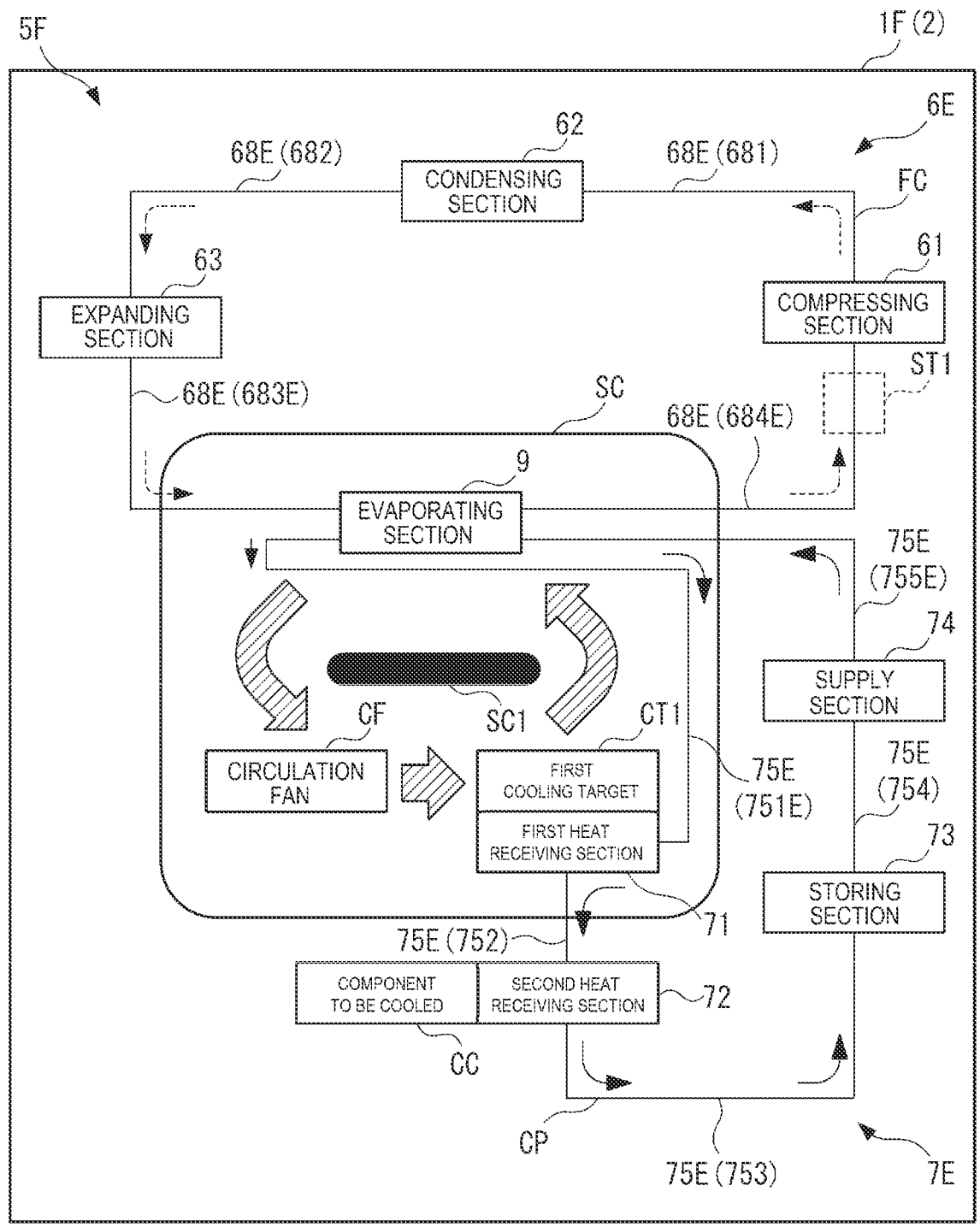
FIG. 12 is a schematic diagram showing a cooling device of a projector in a sixth embodiment.

FIG. 12 is a schematic diagram showing the configuration of a cooling device 5F included in a projector 1F according to this embodiment.

The projector 1F according to this embodiment has the same configuration and the same function as the configuration and the function of the projector 1B according to the second embodiment except that the projector 1F includes the cooling device 5F shown in FIG. 12 instead of the cooling device 5B according to the second embodiment. That is, the projector 1F includes the sealed housing SC functioning as the housing that houses the first cooling target CT1 including the light modulators 343.

The cooling device 5F includes the first circulation device 6E and the second circulation device 7E. Like the cooling device 5B, the cooling device 5F cools the first cooling target CT1 and the component to be cooled CC.

The heat exchanger 93 of the evaporator 9 evaporates, with the heat of the cooling gas in the sealed housing SC and the heat of the liquid refrigerant flowing in the second channel 92, the working fluid flowing in the first channel 91 to consume the heat of the liquid refrigerant and cool the liquid refrigerant. That is, the evaporator 9 cools, with the working fluid, the cooling gas and the liquid refrigerant flowing to the first cooling target CT1. The first cooling target CT1 is cooled by the cooled cooling gas and the cooled liquid refrigerant.

Effect in the Sixth Embodiment

The projector 1F according to this embodiment explained above can achieve the same effects as the effects of the projectors 1A, 1B, and 1E according to the first, second, and fifth embodiments.

Seventh Embodiment

A seventh embodiment of the present disclosure is explained.

A projector according to this embodiment has the same configuration as the configuration of the projector 1D according to the fourth embodiment. However, the projector is different from the projector 1D according to the fourth embodiment in that, as in the cooling device 5E according to the fifth embodiment and the cooling device 5F according to the sixth embodiment, a first evaporator and a heat exchanger are integrated. In the following explanation, the same or substantially the same portions as the portions explained above are denoted by the same reference numerals and signs and explanation of the portions is omitted.

Figure 13:
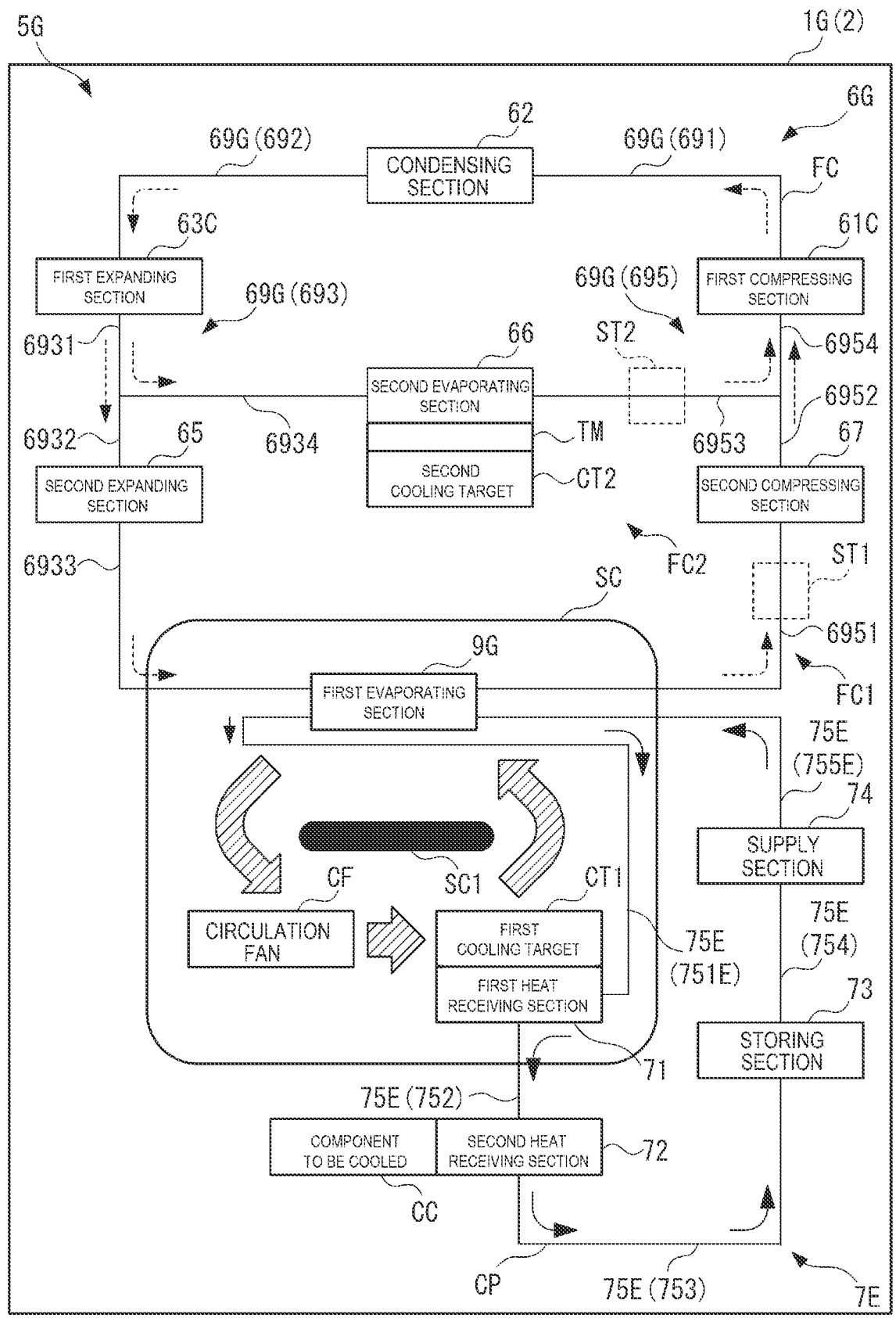
FIG. 13 is a schematic diagram showing a cooling device of a projector in a seventh embodiment.

FIG. 13 is a schematic diagram showing the configuration of a cooling device 5G included in a projector 1G according to this embodiment.

The projector 1G according to this embodiment has the same configuration and the same function as the configuration and the function of the projector 1D according to the fourth embodiment except that the projector 1G includes the cooling device 5G shown in FIG. 13 instead of the cooling device 5D according to the fourth embodiment. That is, the projector 1G includes the sealed housing SC functioning as the housing in which the first cooling target CT1 is housed.

The cooling device 5G includes a first circulation device 6G and the second circulation device 7e and, like the cooling device 5D, cools the first cooling target CT1, the second cooling target CT2, and the component to be cooled CC.

Configuration of the First Circulation Device

The first circulation device 6G has the same configuration and the same function as the configuration and the function of the first circulation device 6C except that the first circulation device 6G includes a first evaporator 9G instead of the first evaporator 64C and the heat exchanger 8 and includes a plurality of pipes 69G instead of the plurality of pipes 69.

The plurality of pipes 69G have the same configuration as the configuration of the plurality of pipes 69 according to the fourth embodiment. However, the fourth pipe 694 is omitted. In the cooling device 5G, the partial pipe 6933 of the third pipe 693 connects the second expander 65 and the first evaporator 9G. The partial pipe 6951 of the fifth pipe 695 connects the first evaporator 9G and the second compressor 67.

The first evaporator 9G is obtained by integrating the first evaporator 64C and the heat exchanger 8. The first evaporator 9G is disposed at an interval from the first cooling target CT1. The first evaporator 9G is disposed across the first fluid circulation channel FC1 of the fluid circulation channel FC and the refrigerant circulation channel CP. Both of the working fluid and the liquid refrigerant flow in the first evaporator 9G.

The first evaporator 9G includes the first channel 91, the second channel 92, and the heat exchanger 93 and functions in the same manner as the evaporator 9.

The first channel 91 is connected to the second expander 65 via the partial pipe 6933 and connected to the second compressor 67 via the partial pipe 6951. The working fluid flows into the first channel 91 from the second expander 65. The working fluid having flowed in the first channel 91 is discharged to the second compressor 67 and the first compressor 61C.

The second channel 92 is connected to the supply section 14 via the fifth flow pipe 755 and connected to the first heat receiver 71 via the first flow pipe 751. The liquid refrigerant supplied by the supply section 74 flows into the second channel 92. The liquid refrigerant having flowed in the second channel 92 flows to the first heat receiver 71.

In the first evaporator 9G, the heat exchanger 93 changes, with the heat of the cooling gas in the sealed housing SC and the heat of the liquid refrigerant flowing in the second channel 92, the working fluid flowing in the first channel 91 to the working fluid in the gas phase to cool the cooling gas and the liquid refrigerant. The cooled cooling gas flows to the first cooling target CT1 and the cooled liquid refrigerant flows to the first heat receiver 71 heat-transferably connected to the first cooling target CT1, whereby the first cooling target CT1 is cooled.

Effects in the Seventh Embodiment

With the projector 1G according to this embodiment explained above, the same effects as the effects of the projectors 1A, 1B, 1C, 1D, 1E, and 1F according to the embodiments explained above can be achieved.

Modifications of the Embodiments

The present disclosure is not limited to the embodiments. Modifications, improvements, and the like in a range in which the object of the present disclosure can be achieved are included in the present disclosure.

For example, the configurations of at least two cooling devices among the cooling devices 5A to 5G may be combined.

The cooling devices 5A to 5G may not cool the second cooling target CT2 and the component to be cooled CC. Accordingly, the second heat receiver 72 heat-transferably connected to the component to be cooled CC and the second evaporator 66 heat-transferably connected to the second cooling target CT2 are not always necessary. Further, the cooling device only has to be able to cool, with the working fluid circulating in the fluid circulation channel, the liquid refrigerant flowing to the first heat receiver heat-transferably connected to the first cooling target. The heat of the first cooling target may not be transferred to the evaporator and the first evaporator via the cooling gas or the like. The cooling gas cooled by the evaporator and the first evaporator may not flow to the first cooling target.

In the first, third, and fifth embodiments, the evaporator 64, the first evaporator 64C, and the evaporator 9 are disposed at an interval from the first cooling target CT1. However, not only this, but the evaporator and the first evaporator may be heat-transferably connected to the first cooling target CT1 via the heat transfer member. The heat transfer member is a member made of metal having thermal conductivity. The evaporator and the first evaporator evaporate, with the heat transferred from the first cooling target CT1 via the heat transfer member, the working fluid in the liquid phase flowing from the expander and changes the working fluid in the liquid phase to the working fluid in the gas phase. Consequently, the evaporator and the first evaporator cool the first cooling target CT1.

In the second, fourth, sixth, and seventh embodiments, the projectors 1B, 1D, F, and 1G include the sealed housing SC as the housing in which the first cooling target CT1 is housed. However, not only this, but the cooling gas flowing to the first cooling target CT1 only has to be cooled by the evaporator or the first evaporator. The housing that is disposed in the exterior housing 2 and houses the first cooling target CT1 may be absent. The housing does not always need to be sealed like the sealed housing SC.

In the embodiments, the second circulation devices 7A and 7E include the reserver 73 and the supply section 74. However, not only this, but at least one of the reserver 73 and the supply section 74 may be absent if the liquid refrigerant can be circulated in the refrigerant circulation channel included in the second circulation device.

In the first to fourth embodiments, the heat exchanger 8 includes the first channel 81 in which the working fluid flows, the second channel 82 in which the liquid refrigerant flows, and the housing 83 functioning as the channel housing provided on the insides of the first channel 81 and the second channel 82. The second channel 82 is the space 83S provided on the inside of the housing 83 and surrounding the first channel 81. However, not only this, but the configuration of the heat exchanger 8 can be changed as appropriate. For example, the heat exchanger 8 may have a configuration in which the tubular member forming the first channel 81 and the tubular member forming the second channel 82 are heat-transferably connected via the heat transfer member or the like.

Similarly, the evaporators 9 and 9G are not limited to the configuration shown in FIG. 11. The configuration of the evaporators 9 and 9G can be changed as appropriate.

In the first and second embodiments, the heat exchanger 8 is disposed in a path from the evaporator 64 to the compressor 61 in the flowing direction of the working fluid in the fluid circulation channel FC. In the third and fourth embodiments, the heat exchanger 8 is disposed in a path from the first evaporator 64C to the second compressor 67 in the flowing direction of the working fluid in the fluid circulation channel FC. However, not only this, but the heat exchanger 8 may be disposed in a path from the expander 63 to the evaporator 64 or a path from the second expander 65 to the first evaporator 64C in the flowing direction of the working fluid in the fluid circulation channel FC.

In the first to fourth embodiments, the heat exchanger 8 is provided in a path from the supply section 74 to the first heat receiver 71 in the flowing direction of the liquid refrigerant in the refrigerant circulation channel CP. However, not only this, but the heat exchanger 8 may be provided in any path in the refrigerant circulation channel CP. That is, the heat exchanger 8 may be provided in any one of a path from the first heat receiver 71 to the second heat receiver 72, a path from the second heat receiver 72 to the reserver 73, and the path from the reserver 73 to the supply section 74. In the fifth to seventh embodiments, the same applies to the evaporator 9 and the first evaporator 9G.

In the embodiments, the cooling devices 5A to 5G include the second heat receiver 72 connected to the component to be cooled CC. However, not only this, but the second heat receiver 72 may be absent. When the second heat receiver 72 is provided in the fluid circulation channel FC, the second heat receiver 72 may be located in a path from one of the heat exchanger 8, the evaporator 9, and the first evaporator 9G to the first heat receiver 71 in the flowing direction of the liquid refrigerant. The second heat receiver 72 may be located in the opposite direction of the flowing direction of the working fluid to at least one of the first evaporator and the second expander between the first expander and the first compressor, that is, upstream of the flowing direction of the working fluid.

In the embodiments, the cooling devices 5A to 5G include the cooling fan that causes the cooling gas to flow to the condenser 62. However, not only this, but the cooling fan may be absent.

If the cooling gas can circulate in the sealed housing SC, the circulation fan CF disposed in the sealed housing SC may be absent.

In the embodiments, the projectors 1A to 1G include the image projecting device 3 shown in FIG. 2 and the image projecting device 3 includes the light source device 4 shown in FIG. 3. However, not only this, but the configuration and the layout of the optical components included in the image projecting device 3 can be changed as appropriate and the configuration and the layout of the optical components included in the light source device 4 can be changed as appropriate. For example, the wavelength conversion element 46 included in the light source device 4 is a reflection-type wavelength conversion element that emits the fluorescent light YL generated by the wavelength conversion section 461 to the incident side of the blue light Lis. However, a transmission-type wavelength conversion element that emits fluorescent light along the incident direction of the blue light Lis may be adopted in the light source device.

In the embodiments, the light source 411 of the light source device 4 includes the semiconductor lasers 412 and 413. However, not only this, but the light source device 4 may include, as light sources, light source lamps such as an ultrahigh pressure mercury lamp or other solid-state light sources such an LED. The light source device 4 may include, as the light sources, other solid-state light sources such as LDs or LEDs or light source lamps that respectively emit red, green, and blue lights. In this case, the cooling targets of the cooling devices 5A to 5G may include the other solid-state light sources or the light source lamps.

In the embodiments, the projectors 1A to 1G include the three light modulators 343 (343B, 343G, and 343R). However, not only this, but the present disclosure is also applicable to a projector including two or less or four or more light modulators.

In the embodiments, the light modulator 343 is the transmission-type liquid crystal panel, a light incident surface and a light emission surface of which are different. However, not only this, but, as the light modulator, a reflection-type liquid crystal panel, a light incident surface and a light emission surface of which are the same, may be used. A light modulator other than the liquid crystal panel such as a light modulator that makes use of a device including a micromirror, for example, a DMD (Digital Micromirror Device) may be used if the light modulator is a light modulator capable of modulating an incident light beam and forming an image corresponding to image information.

Overview of the Present Disclosure

An overview of the present disclosure is appended below.

A projector according to an aspect of the present disclosure modulates and projects light emitted from a light source, and the projector includes: a first cooling target; a cooling device configured to cool the first cooling target; and an exterior housing configured to house the first cooling target and the cooling device. The cooling device includes: a first circulation device in which working fluid circulates; a second circulation device in which a liquid refrigerant circulates; and a heat exchanger in which both of the working fluid and the liquid refrigerant flow. The first circulation device includes: a first compressor configured to compress the working fluid in a gas phase; a condenser configured to condense the working fluid in the gas phase compressed by the first compressor into the working fluid in a liquid phase; a first expander configured to decompress the working fluid in the liquid phase condensed by the condenser and change the working fluid in the liquid phase to the working fluid in a mixed phase of the liquid phase and the gas phase; and a first evaporator configured to change the working fluid caused to flow into the first evaporator from the first expander to the working fluid in the gas phase with heat transferred from the first cooling target and discharge the changed working fluid in the gas phase to the first compressor. The second circulation device includes a first heat receiver heat-transferably connected to the first cooling target, the liquid refrigerant flowing on an inside of the first heat receiver. The heat exchanger includes: a first channel in which the working fluid having flowed in the first expander flows; and a second channel in which the liquid refrigerant having flowed in the first heat receiver flows. The heat exchanger cools the liquid refrigerant flowing in the second channel with the working fluid flowing in the first channel.

With such a configuration, since the cooling device is provided in the exterior housing together with the first cooling target, compared with when a part of the cooling device is provided outside the exterior housing, it is possible to easily carry out setting of the projector. It is possible to make the exterior of the projector satisfactory and configure the projector to be small. It is possible to easily move the projector.

Further, the first evaporator of the first circulation device changes the working fluid in the liquid phase to the working fluid in the gas phase using the heat of the first cooling target, whereby the first cooling target is cooled. The liquid refrigerant cooled by the heat exchange with the working fluid in the heat exchanger flows to the first heat receiver heat-transferably connected to the first cooling target, whereby the first cooling target is cooled. Consequently, for example, compared with when the liquid refrigerant cooled by heat exchange with air flows to the first heat receiver, it is possible to cause the liquid refrigerant having low temperature to flow to the first heat receiver. Therefore, it is possible to improve cooling efficiency of the first cooling target.

In the aspect, the projector may further include a housing in which the first cooling target and the first evaporator are disposed, and the first evaporator may cool a cooling gas in the housing and cool the first cooling target.

An optical component such as the light modulator needs to be accurately disposed in a predetermined position. That is, a disposition position of the optical component needs to be finely adjusted. Therefore, when such an optical component is the first cooling target, a pipe connected to the first evaporator is requested to be flexible in order to connect the first evaporator to the first cooling target. However, since the pressure of the working fluid flowing in the pipe is relatively high, it is difficult from the viewpoint of the strength of the pipe to adopt a flexibly displaceable pipe as the pipe forming the fluid circulation channel. That is, it is difficult to heat-transferably connect the first evaporator to the first cooling target such as the optical component.

In contrast, with the configuration explained above, since the cooling gas cooled by the first evaporator cools the first cooling target in the housing, it is unnecessary to physically connect the first cooling target and the first evaporator. Accordingly, the liquid refrigerant flows to the first heat receiver, whereby the first cooling target can be cooled. The cooling gas flows to the first cooling target, whereby the first cooling target can be cooled. Therefore, it is possible to, while improving cooling efficiency of the first cooling target, simply configure the cooling device capable of cooling the first cooling target.

The first cooling target and the first evaporator are provided in the housing. Therefore, it is possible to prevent the temperature of the cooling gas from rising with the heat on the outside of the housing. Besides, it is possible to improve dust resistance of the first cooling target and the first evaporator.

In the aspect, the heat exchanger may include a channel housing in which the first channel and the second channel are provided, and the second channel may be a space surrounding the first channel.

With such a configuration, the second channel surrounds the first channel on the inside of the channel forming housing. In other words, the first channel is surrounded by the liquid refrigerant flowing on an inside of the second channel. Consequently, compared with a configuration in which a tubular member forming the first channel and a tubular member forming the second channel are in contact, it is possible to make it easy to transfer the heat of the liquid refrigerant flowing in the second channel to the working fluid flowing in the first channel. Therefore, it is possible to efficiently cool the liquid refrigerant and efficiently cool the first cooling target.

In the aspect, the first evaporator and the heat exchanger may be integrated, and the first evaporator may change the working fluid flowing in the first channel to the working fluid in the gas phase with the heat transferred from the first cooling target and heat of the liquid refrigerant flowing in the second channel.

With such a configuration, it is possible to achieve a reduction in the size of the cooling device and the size of the projector.

In the aspect, the projector may further include a component to be cooled different from the first cooling target, and the second circulation device may include a second heat receiver heat-transferably connected to the component to be cooled, the liquid refrigerant flowing on an inside of the second heat receiver.

With such a configuration, the liquid refrigerant flows to the second heat receiver to which the heat of the component to be cooled is transferred, whereby the component to be cooled can be cooled. Therefore, since it is unnecessary to individually provide the cooling device for each of the first cooling target and the component to be cooled, it is possible to simplify the configuration of the projector. Besides, since the cooling device can cool the first cooling target and the component to be cooled, it is possible to improve versatility of the cooling device.

In the aspect, the projector may further include a component to be cooled different from the first cooling target, the first circulation device may include a second heat receiver heat-transferably connected to the component to be cooled, the working fluid flowing on an inside of the second heat receiver, and the second heat receiver may be disposed in a path from the first expander to the first compressor in a flowing direction of the working fluid.

With such a configuration, the working fluid flows to the second heat receiver to which the heat of the component to be cooled is transferred, whereby the component to be cooled can be cooled. Therefore, as in the case in which the second circulation device includes the second heat receiver, it is possible to simplify the configuration of the projector. Besides, it is possible to improve the versatility of the cooling device.

In the aspect, the projector may further include a second cooling target different from the first cooling target, and the first circulation device may include: a second expander configured to decompress the working fluid decompressed by the first expander; a second evaporator configured to change the working fluid flowing from the first expander to the working fluid in the gas phase with heat transferred from the second cooling target; and a second compressor configured to compress the working fluid flowing into the second compressor from the first evaporator and discharge the compressed working fluid to the first compressor.

With such a configuration, the second evaporator changes the working fluid in the liquid phase to the working fluid in the gas phase using the heat of the second cooling target. Consequently, since the heat of the second cooling target is consumed by the second evaporator, it is possible to cool the second cooling target.

The circulation channel of the working fluid including the first evaporator and the circulation channel of the working fluid including the second evaporator share the first compressor, the condenser, and the first expander. Accordingly, it is possible to simplify the configuration of the cooling device that can cool the first cooling target and the second cooling target. Besides, it is possible to configure the cooling device to be small and configure the projector to be small.

In the aspect, the projector may further include a component to be cooled different from the first cooling target and the second cooling target, the first circulation device may include a second heat receiver heat-transferably connected to the component to be cooled, the working fluid flowing on an inside of the second heat receiver, and the second heat receiver may be disposed in a path between the second expander and the second compressor in a flowing direction of the working fluid.

With such a configuration, as explained above, it is possible to cool the component to be cooled. It is possible to simplify the configuration of the projector. Besides, it is possible to improve the versatility of the cooling device.

In the aspect, the projector may further include a power supply device configured to supply electric power, and the component to be cooled may be the power supply device.

With such a configuration, since it is unnecessary to individually provide the cooling device for each of the first cooling target and the power supply device, it is possible to simplify the configuration of the projector. Besides, since the cooling device can cool the first cooling target and the power supply device, it is possible to improve the versatility of the cooling device.

In the aspect, the projector may further include a light modulator configured to modulate the light emitted from the light source, and the first cooling target may be the light modulator.

With such a configuration, it is possible to effectively cool the light modulator.

What is claimed is:

1. A projector that modulates and projects light emitted from a light source, the projector comprising:
   a first cooling target;
   a second cooling target different from the first cooling target;
   a cooling device configured to cool the first cooling target; and
   an exterior housing accommodating the first cooling target and the cooling device, wherein
   the cooling device includes a first circulation device in which working fluid circulates, a second circulation device in which a liquid refrigerant circulates, and a heat exchanger in which both of the working fluid and the liquid refrigerant flow,
   the first circulation device includes:
      a first compressor configured to compress the working fluid in a gas phase;
      a condenser configured to condense the working fluid in the gas phase compressed by the first compressor into the working fluid in a liquid phase;
      a first expander configured to decompress the working fluid in the liquid phase condensed by the condenser and change the working fluid in the liquid phase to the working fluid in a mixed phase of the liquid phase and the gas phase;
      a first evaporator configured to change the working fluid flowed from the first expander to the working fluid in the gas phase with heat transferred from the first cooling target, and configured to discharge the changed working fluid in the gas phase to the first compressor;
      a second expander configured to decompress the working decompressed by the first expander;
      a second evaporator configured to change the working fluid flowing from the first expander to the working fluid in the gas phase with heat transferred from the second cooling target; and
      a second compressor configured to compress the working fluid flowing from the first evaporator and discharge the compressed working fluid to the first compressor,
   the second circulation device includes a first heat receiver heat-transferably connected to the first cooling target, the liquid refrigerant flowing on an inside of the first heat receiver, and
   the heat exchanger includes a first channel in which the working fluid having flowed in the first expander flows, and a second channel in which the liquid refrigerant having flowed in the first heat receiver flows, and
   the heat exchanger cools the liquid refrigerant flowing in the second channel with the working fluid flowing in the first channel.

2. The projector according to claim 1, further comprising a housing in which the first cooling target and the first evaporator are disposed, wherein
   the first evaporator cools a cooling gas in the housing and cools the first cooling target.

3. The projector according to claim 1, wherein
   the heat exchanger includes a channel housing in which the first channel and the second channel are provided, and
   the second channel is a space surrounding the first channel.

4. The projector according to claim 1, wherein
   the first evaporator and the heat exchanger are integrated, and
   the first evaporator changes the working fluid flowing in the first channel to the working fluid in the gas phase with the heat transferred from the first cooling target and heat of the liquid refrigerant flowing in the second channel.

5. The projector according to claim 1, further comprising a component to be cooled different from the first cooling target and the second cooling target, wherein
   the first circulation device includes a second heat receiver heat-transferably connected to the component to be cooled, the working fluid flowing on an inside of the second heat receiver, and
   the second heat receiver is disposed in a path between the second expander and the second compressor in a flowing direction of the working fluid.

6. The projector according to claim 1, further comprising a component to be cooled different from the first cooling target, wherein
   the second circulation device includes a second heat receiver heat-transferably, connected to the component to be cooled, the liquid refrigerant flowing on an inside of the second heat receiver.

7. The projector according to claim 1, further comprising a component to be cooled different from the first cooling target, wherein
   the first circulation device includes a second heat receiver heat-transferably connected to the component to be cooled, the working fluid flowing on an inside of the second heat receiver, and
   the second heat receiver is disposed in a path from the first expander to the first compressor in a flowing direction of the working fluid.

8. The projector according to claim 5, further comprising a power supply, device configured to supply electric power, wherein
   the component to be cooled is the power supply device.

9. The projector according to claim 6, further comprising a power supply device configured to supply electric power, wherein
   the component to be cooled is the power supply device.

10. The projector according to claim 7, further comprising a power supply device configured to supply electric power, wherein
    the component to be cooled is the power supply device.

11. The projector according to claim 1, further comprising a light modulator configured to modulate the light emitted from the light source; wherein
    the first cooling target is the light modulator.

12. A projector that modulates and projects light emitted from a light source, the projector comprising:
    a first cooling target;
    a component to be cooled different from the first cooling target;
    a cooling device configured to cool the first cooling target; and
    an exterior housing accommodating the first cooling target and the cooling device, wherein the cooling device includes a first circulation device in which working fluid circulates, a second circulation device in which a liquid refrigerant circulates, and a heat exchanger in which both of the working fluid and the liquid refrigerant flow, the first circulation device includes:
- a first compressor configured to compress the working fluid in a gas phase;
- a condenser configured to condense the working fluid in the gas phase compressed by the first compressor into the working fluid in a liquid phase;
- a first expander configured to decompress the working fluid in the liquid phase condensed by the condenser and change the working fluid in the liquid phase to the working fluid in a mixed phase of the liquid phase and the gas phase;
- a first evaporator configured to change the working fluid flowed from the first expander to the working fluid in the gas phase with heat transferred from the first cooling target, and configured to discharge the changed working fluid in the gas phase to the first compressor;

the second circulation device includes a first heat receiver heat-transferably connected to the first cooling target, the liquid refrigerant flowing on an inside of the first heat receiver, and the heat exchanger includes a first channel in which the working fluid having flowed in the first expander flows, and a second channel in which the liquid refrigerant having flowed in the first heat receiver flows, the heat exchanger cools the liquid refrigerant flowing in the second channel with the working fluid flowing in the first channel, the first circulation device includes a second heat receiver heat-transferably connected to the component to be cooled, the working fluid flowing on an inside of the second heat receiver, and the second heat receiver is disposed in a path from the first expander to the first compressor in a flowing direction of the working fluid.

13. The projector according to claim 12, further comprising a light modulator configured to modulate the light emitted from the light source, wherein
the first cooling target is the light modulator.

14. The projector according to claim 12, further comprising a power supply device configured to supply electric power, wherein
the component to be cooled is the power supply device.

15. The projector according to claim 12, further comprising a housing in which the first cooling target and the first evaporator are disposed, wherein
the first evaporator cools a cooling gas in the housing and cools the first cooling target.

\* \* \* \* \*